United States Patent
Haager et al.

(10) Patent No.: US 10,657,270 B2
(45) Date of Patent: ***May 19, 2020

(54) SYSTEMS AND METHODS FOR CRYPTOGRAPHIC-CHAIN-BASED GROUP MEMBERSHIP CONTENT SHARING

(71) Applicant: Topia Technology, Inc., Tacoma, WA (US)

(72) Inventors: John Haager, Bonney Lake, WA (US); Cody Sandwith, Tacoma, WA (US); Janine Terrano, Gig Harbor, WA (US); Prasad Saripalli, Tacoma, WA (US)

(73) Assignee: TOPIA TECHNOLOGY, INC., Tacoma, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/217,949

(22) Filed: Dec. 12, 2018

(65) Prior Publication Data

US 2019/0121990 A1    Apr. 25, 2019

Related U.S. Application Data

(62) Division of application No. 15/952,586, filed on Apr. 13, 2018, now Pat. No. 10,162,971, which is a
(Continued)

(51) Int. Cl.
*G06F 21/60* (2013.01)
*H04L 29/06* (2006.01)
(Continued)

(52) U.S. Cl.
CPC ............ *G06F 21/602* (2013.01); *G06F 21/62* (2013.01); *H04L 9/0869* (2013.01);
(Continued)

(58) Field of Classification Search
CPC ... G06F 21/602; G06F 21/62; H04L 63/0428; H04L 9/0861; H04L 63/0478; H04L 9/0869; H04L 9/0894; H04L 9/14
(Continued)

(56) References Cited

U.S. PATENT DOCUMENTS 8,812,874 B1    8/2014  Clifford
9,450,923 B2    9/2016  Klum et al.
(Continued)

OTHER PUBLICATIONS

International Search Report and Written Opinion dated Feb. 5, 2016 for PCT Application No. US2015/028045.

*Primary Examiner* — Kambiz Zand
*Assistant Examiner* — Benjamin A Kaplan
(74) *Attorney, Agent, or Firm* — Pillsbury Winthrop Shaw Pittman LLP

(57) ABSTRACT

In some embodiments, a first device may generate a data block for an ordered set of data blocks such that the data block is cryptographically chained to a given data block preceding the data block in the ordered set. The first device may obtain an encryption key used to encrypt information related to the data block, and use group members' keys to encrypt the encryption key to generate a group key. As an example, the group's members may include a first member associated with the first device and other members. The keys used to encrypt the encryption key may include the other members' keys. The first device may transmit the ordered set and the group key to a communication resource (e.g., accessible by the members). Other devices (associated with the other members) may use the ordered set and the group key to obtain content related to the ordered set.

20 Claims, 8 Drawing Sheets

Related U.S. Application Data division of application No. 14/698,030, filed on Apr. 28, 2015, now Pat. No. 9,990,502.

(60) Provisional application No. 61/985,360, filed on Apr. 28, 2014.

(51) Int. Cl.
*G06F 21/62* (2013.01)
*H04L 9/08* (2006.01)
*H04L 9/14* (2006.01)

(52) U.S. Cl.
CPC .............. *H04L 9/0894* (2013.01); *H04L 9/14* (2013.01); *H04L 63/0428* (2013.01); *H04L 63/0478* (2013.01)

(58) Field of Classification Search
USPC ........................................................ 713/165
See application file for complete search history.

(56) References Cited

U.S. PATENT DOCUMENTS

| | | |
|---|---|---|
| 2004/0107342 A1 | 6/2004 | Pham |
| 2006/0064383 A1 | 3/2006 | Marking |
| 2007/0067332 A1 | 3/2007 | Gallagher et al. |
| 2013/0073527 A1 | 3/2013 | Bromley |
| 2014/0013112 A1 | 1/2014 | Cidon |
| 2014/0136832 A1 | 5/2014 | Klum et al. |
| 2015/0154418 A1 | 6/2015 | Redberg |

SYSTEMS AND METHODS FOR CRYPTOGRAPHIC-CHAIN-BASED GROUP MEMBERSHIP CONTENT SHARING

CROSS-REFERENCE TO RELATED APPLICATIONS

This application is a divisional application of U.S. patent application Ser. No. 15/952,586, filed on Apr. 13, 2018, which is a divisional application of U.S. patent application Ser. No. 14/698,030, filed Apr. 28, 2015, now U.S. Pat. No. 9,990,502, which claims the benefit of U.S. Provisional Application No. 61/985,360, filed Apr. 28, 2014, each of which is incorporated herein by reference in its entirety.

BACKGROUND OF THE INVENTION

Security and privacy of data in Cloud, Big Data, Mobile, and Internet of Things (IoT) workflows benefits from hardening and protection of data and computing resources, both online and at rest. All workflows go through a data lifecycle comprised of these stages: create, store, use (compute), share, archive, and destroy.

Big Data Analytics (BDA) is characterized by collection and storage of very large volumes of data and running analytics on such data stores to answer specific, time-sensitive questions. Data warehousing for Business Intelligence (BI) is a well-known precursor to BDA. For many years, Enterprise has been collecting growing volumes of data in data warehouses, and running analytics for BI. High-performance computing (HPC) systems are another application where one runs very large data sets through to model complex scientific phenomena. However, BDA applications are orders of magnitude larger in scale and differ in the type of data that are to be focused on, which is predominantly unstructured data. HPC and data warehousing typically deal with structured data. Their operations are run on a batch basis, often overnight for data warehousing, and over several days or even weeks for HPC. In contrast, BDA answers questions in real-time or near real-time, which involves storage and compute platforms that can handle very large amounts of data, and which can scale appropriately to keep up with growth. It is also preferred to provide the input/output operations per second (IOPS) desired to meet the query speed requirements. Currently, the largest BDA practitioners address this need using hyperscale computing environments, which are built by provisioning large numbers (hundreds of thousands) of commodity servers with direct-attached storage (DAS). Redundancy is provided for fail over via mirroring. Such environments run Analytics engines and typically have Peripheral Component Interconnect Express (PCIe) flash storage alone in the server or in addition to disk to reduce storage latency to a minimum. These types of environments typically do not use shared storage. However, given the behemoth size, scale and cost of HSEs, it is unlikely that the majority of large to small Enterprises would opt for such hyper-scale platforms. Alternative innovations are desired.

Commodity Cloud platforms can provide the necessary computational power for such BDA applications, but they do not have the desired very large amounts of DAS. Typical modern big data storage systems are often scale-out or clustered network-attached storage (NAS), which provide file access shared storage that can scale out to meet capacity or increased compute requirements. Such NAS uses parallel file systems distributed across many storage nodes which can handle billions of files without performance degradation experienced by ordinary file systems at scale. However, such NAS cannot always be collocated with the Cloud platforms, which represent the computational power. In other words, the Big Data and Big Compute (i.e., Cloud) platforms cannot always be collocated. There is a need for hybrid platform architectures which can facilitate BDA without insisting on collocation of Compute and Big Data stores.

If Cloud (compute) and Big Data stores cannot be collocated, an alternative is that they remain at separate locations, and the analytics (e.g., search) workloads are conducted as distributed processes over the Internet. There are two concerns with this model: concerns regarding the confidentiality of data, as well as its sovereignty and privacy, and concerns regarding the security of data and protection from data breaches. Data tampering, hacking, and illicit information disclosure are major security threats to storing and sharing data assets, such as files, in such environments. For example, healthcare organizations, business associates and subcontractors that support the processing or collecting of protected health information are required to comply with the Healthcare Insurance Portability and Accountability Act (HIPAA). However, unsecured or unencrypted data is commonly found in healthcare data breaches. Compliance is a key driver for the Enterprise customers' need for advanced, complete security and privacy solutions and services on modern, large scale distributed computer systems.

SUMMARY OF THE INVENTION

In various aspects, the present disclosure relates to facilitating group membership content sharing. In some embodiments, a first device may generate a first data block for an ordered set of data blocks (e.g., related to members of the group) such that the first data block is cryptographically chained to a data block preceding the first data block in the ordered set. The first device may obtain an encryption key used to encrypt information related to the first data block, and use keys of two or more members of the group to encrypt the encryption key to generate a group key. As an example, the group's members may include a first member associated with the first device, a second member associated with a second device, and one or more other members. The group key may include the encrypted encryption key, and the keys used to encrypt the encryption key may include a key of the second member and one or more keys of the one or more other members. The first device may transmit the ordered set and the group key to a communication resource (e.g., to which the second device or other devices of other members have access). The second device may access and use the ordered set and the group key to obtain content related to the ordered set.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1A illustrates a schematic embodiment of a networked computer system comprising a file transfer server, a source computer system, and a recipient computer system for transferring a file there between.

DETAILED DESCRIPTION

Figure 1A:
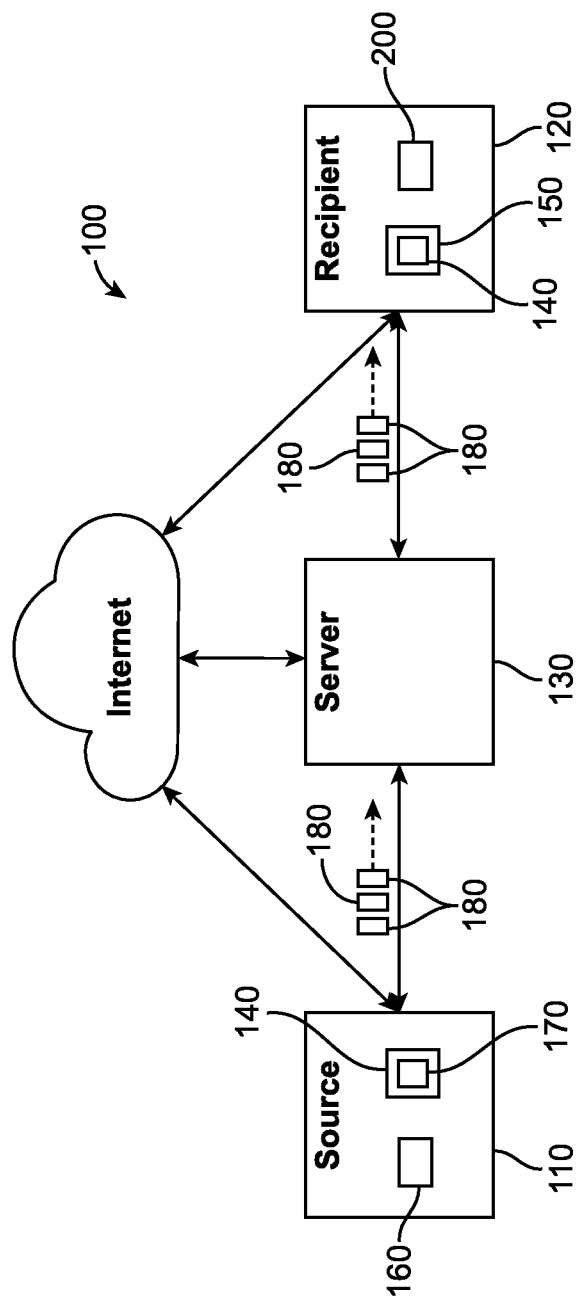

Certain following embodiments refer to distributed computer systems, wherein two or more computers are connected via a network link, for example, as shown in FIG. 1. In this context, the term "computer" is understood to include any computing device, including, but not limited to, PC, server, laptop, desktop, cellular phone, sensors, IoT devices or appliance capable of electronic communication over a network. The term "file" is used to denote any data asset including files, folders, software, virtual machines, data streams and data payloads of various kinds. The term "processors" as used herein may include those processors implemented in any one or more of, for example, a personal computer, portable computer, personal digital assistant (PDA), workstation or other processor-driven device, and examples of network may include, for example, a private network, the Internet or other network types, including both wired and wireless networks. The term "node" as used herein should be defined broadly to include sensors, devices, systems and otherwise as would be understood by one skilled in the art. The terms "segment" and "chunk" are used interchangeably. The terms "reorder" and "shuffle" are used interchangeably.

Those with ordinary skill in the art will appreciate that the systems and methods described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Described herein is an exemplary system which may be implemented through computer software running in a processor to prepare a file for transport to another computer system. This description is not intended to be limiting, but is merely provided to describe ways of accomplishing the functions associated with the systems herein.

In various aspects, the present disclosure provides method for hardening the security, confidentiality, and privacy of a file, a method comprising: segmenting at a first computer system a file into a plurality of file segments; and encrypting the plurality of file segments using a plurality of encryption keys in order to generate a corresponding plurality of encrypted file segments, wherein each file segment of the plurality of file segments is encrypted using a respective encryption key of the plurality of encryption keys. In some embodiments, the method further comprises encrypting the plurality of encryption keys so as to generate a plurality of encrypted encryption keys. In some embodiments, the method further comprises generating file description data that comprises the plurality of encryption keys. In further embodiments, the method further comprises transferring the file description data and the plurality of encrypted file segments from the at least one source computer processor to at least one recipient computer processor. In further embodiments, the method further comprises receiving the file description data and the plurality of encrypted file segments; decrypting the plurality of encrypted encryption keys in order to obtain the plurality of encryption keys; decrypting the plurality of encrypted file segments in order to obtain the plurality of file segments; and combining the plurality of file segments so as to generate a copy of the file. In some embodiments, the method further comprises transferring the file description data and the plurality of encrypted file segments, wherein the transferring is performed using a file transfer server networked between the first computer system and the second computer system. In some embodiments, the method further comprises determining if an equivalent of each file segment is present at the file transfer server or the second computer system; and transferring file segments for which no equivalent of the file segment is present at the file transfer server or the second computer system. In some embodiments, the method further comprises distributing the plurality of file segments among a plurality of randomly chosen storage locations. In some embodiments, the method further comprises compressing each file segment. In some embodiments, the method further comprises receiving user input indicating an identity of the file. In some embodiments, the user input comprises associating the file with a workspace defining users who are permitted to access the file. In some embodiments, the encryption key for one file segment is generated using a different algorithm than the encryption key for another file segment. In some embodiments, the method further comprises encrypting each encryption key in order to generate a corresponding encrypted encryption key. In some embodiments, the method further comprises transferring the plurality of encrypted file segments over a network in parallel. In some embodiments, the size of the file segment in the plurality of file segments is configurable manually, randomly, or according to a pre-defined pattern. In some embodiments, each encryption key of the plurality of encryption keys is independently and randomly generated using a secure, pseudo-random generator. In some embodiments, the method further comprises erasing data of at least one file or file segment.

In various aspects, the present disclosure provides methods for decrypting a file, a method comprising: receiving at a first computer system file description data comprising a plurality of encrypted encryption keys and a plurality of encrypted file segments; decrypting the plurality of encrypted encryption keys in order to obtain a plurality of encryption keys; decrypting the plurality of encrypted file segments in order to obtain a plurality of file segments; and combining each file segment in the plurality of file segments so as to generate a copy of the file. In some embodiments, the method further comprises receiving the file description data from a file transfer server networked with the first computer system and a second computer system. In some embodiments, the method further comprises determining if an equivalent of each file segment is present at the first computer system; and downloading encrypted file segments that correspond to file segments that are not already present at the first computer system.

In another aspect, the present disclosure provides systems for hardening the security, confidentiality, and privacy of a file, the system comprising: one or more processors; and memory, including instructions executable by the one or more processors to cause the system to at least: divide a file at a first computer system into a plurality of file segments, wherein a size of each file segment of the plurality of file segments is configurable; encrypt the plurality of file segments using a plurality of encryption keys in order to generate a corresponding plurality of encrypted file segments, wherein each file segment of the plurality of file segments is encrypted using a respective encryption key of the plurality of encryption keys; encrypt each encryption key in the plurality of encryption keys so as to generate a corresponding plurality of encrypted encryption keys; generate file description data comprising the encrypted encryption keys; transfer the file description data to a recipient computer system; and transfer at least some of the encrypted file segments to the recipient computer system.

In another aspect, the present disclosure provides systems for decrypting a file, the system comprising: one or more processors; and memory, including instructions executable by the one or more processors to cause the system to at least: receive a plurality of file segments and encrypted file description data; decrypt the identity of each of the file segments in the plurality of file segments and of an encryption key that is associated with each file segment in the plurality of file segments; download a plurality of encrypted file segments generated from the plurality of file segments; decrypt each encrypted file segment of the plurality of encrypted file segments using the encryption key that is associated with each file segment in the plurality of file segments; and combine each decrypted file segment into a copy of a file.

In another aspect, the present disclosure provides methods for hardening the security, confidentiality, and privacy of a file, the method comprising: obfuscating at a first computer system digital values of the file in order to generate corresponding obfuscated digital values of the file, wherein the obfuscated digital values of the file retain their contextual integrity and referential integrity; and mapping the obfuscated digital values of the file to the digital values of the file; transferring the obfuscated digital values of the file to a second computer system; using the obfuscated digital values of the file as an input to search, query, or otherwise reference back to the first computer system.

In some embodiments, the method further comprises segmenting at the first computer system the file into a plurality of file segments; and encrypting the plurality of file segments using a plurality of encryption keys in order to generate a corresponding plurality of encrypted file segments, wherein each file segment of the plurality of file segments is encrypted using a respective encryption key of the plurality of encryption keys.

In another aspect, the present disclosure provides systems for transferring a file from one or more source computer processors at a first computer system to one or more recipient computer processors at a second computer system, the first computer system being networked with the second computer system, includes the one or more source computer processors being configured to execute one or more computer program modules. The program modules are configured to divide, via the one or more source computer processors, a file at the first computer system into a plurality of file segments. Details of this process are described in Example 1. The program modules are also configured to encrypt, via the one or more source computer processors, the plurality of file segments as encrypted file segments using a randomly and independently generated encryption key for each file segment in the plurality of file segments. The program modules are also configured to encrypt, via the one or more source computer processors, each randomly and independently generated encryption key as an associated encrypted file segment key. The program modules are also configured to generate, via the one or more source computer processors, file description data including the encrypted file segment keys for the plurality of file segments. The program modules are additionally configured to transfer, via the one or more source computer processors, the file description data to the second computer system. The program modules are further configured to transfer, via the one or more source computer processors, at least some of the encrypted file segments to the second computer system as transferred encrypted file segments. The second computer system is configured to receive the file description data and the transferred encrypted file segments, decrypt the encrypted file segment keys from the file description data into the randomly and independently generated encryption keys, use the randomly and independently generated encryption keys to decrypt each of the transferred encrypted file segments as decrypted file segments, and combine the decrypted file segments into a copy of the file.

In another aspect, the present disclosure provides systems for transferring a file from one or more source computer processors at a first computer system to a file transfer server networked with the first computer system and a second computer system, includes the one or more source computer processors being configured to execute one or more computer program modules. The program modules are configured to divide, via the one or more source computer processors, a file at the first computer system into a plurality of file segments. The program modules are also configured to encrypt, via the one or more source computer processors, the plurality of file segments as encrypted file segments using a randomly and independently generated encryption key for each file segment in the plurality of file segments. The program modules are also configured to encrypt, via the one or more source computer processors, each randomly and independently generated encryption key as an associated encrypted file segment key. The program modules are also configured to generate, via the one or more source computer processors, file description data including the encrypted file segment keys for the plurality of file segments. The program modules are additionally configured to transfer, via the one or more source computer processors, the file description data to the file transfer server. The program modules are further configured to transfer, via the one or more source computer processors, at least some of the encrypted file segments to the file transfer server as transferred encrypted file segments. The file transfer server is configured to receive and store the file description data and the transferred encrypted file segments without knowing the content of the file, the plurality of file segments, or at least a portion of the file description data.

In another aspect, the present disclosure provides systems for receiving a file from a first computer system via one or more recipient computer processors at a second computer system, the second computer system being networked with the first computer system, includes the one or more recipient computer processors being configured to execute one or more computer program modules. The program modules are configured to receive, via the one or more recipient computer processors, encrypted file description data describing a file and a plurality of file segments associated with the first computer system. The program modules are also configured to decrypt, via the one or more recipient computer processors, the identity of the plurality of file segments and a randomly and independently generated encryption key associated with each file segment in the plurality of file segments. The program modules are also configured to download, via the one or more recipient computer processors, a plurality of encrypted file segments generated from the plurality of file segments. The program modules are additionally configured to decrypt, via the one or more recipient computer processors, each of the plurality of encrypted file segments using the randomly and independently generated encryption key associated with each file segment in the plurality of file segments as decrypted file segments. The program modules are further configured to recombine, via the one or more recipient computer processors, the decrypted file segments into a copy of the file stored at the second computer system.

In another aspect, the present disclosure provides systems for receiving a file from a file transfer server via one or more computer processors at a client computer system, the client computer system being networked with the file transfer server, includes the one or more computer processors being configured to execute one or more computer program modules. The program modules are configured to receive, via the one or more computer processors and from the file transfer server, encrypted file description data describing a plurality of file segments associated with a file that is to be received. The program modules are also configured to decrypt, via the one or more computer processors, the identity of the plurality of file segments and a randomly and independently generated encryption key associated with each file segment in the plurality of file segments. The program modules are also configured to download, via the one or more computer processors and from the file transfer server, a plurality of encrypted file segments generated from the plurality of file segments. The program modules are additionally configured to decrypt, via the one or more computer processors, each of the plurality of encrypted file segments using the randomly and independently generated encryption key associated with each file segment in the plurality of file segments as decrypted file segments. The program modules are further configured to recombine, via the one or more computer processors, the decrypted file segments into a copy of the file stored at the computer system.

Systems for security hardening of node to node data transfers across a network channel without an intervening server are also provided herein. Segmentation of individual files into segments may be accomplished without an intervening server between the two computer nodes (i.e., a sender node and a receiver node), as shown in FIG. 1B. File segments are then encrypted, with each segment given a separate key. Segments are stored and transferred in non-sequential order, and their location is listed, and the list is encrypted and stored on the client. Thus, individually encrypted segments of a file and that file's encrypted reassembly instructions are stored separately and cannot be re-assembled or decrypted without authentication. This technology can be applied for security hardening of the file as well as data transfer communications between any two or more computer nodes.

Provided herein are systems and methods for file segment reordering (shuffling) schemes for enhanced security by bidirectional data transformation using obfuscation. Segmentation (chunking) of the file and encrypting each segment with an independent key enhances security because the attacker/adversary has to crack each and every key to obtain the corresponding plaintext completely. Shuffling further enhances security because shuffling is an additional permutation, and permutation adds to diffusion in ciphertext. Diffusion is one of the most desirable properties for any cryptographic system because it enhances security. The confusion and diffusion concept is known in the art. In practice, one can achieve diffusion through Maximum Distance Separable (MDS) matrices, such as the Advanced Encryption Standard (AES) Mix-column step. For example, a file may be segmented into n segments, such that n! ways to permute and/or shuffle them exists, and may be named 1 to n!. Optionally, the order of permutations may be disclosed to the public such that there is a public key. Using $i^{th}$ permutation, one would then shuffle the segments and inform the receiver of the value of i using the public key assigned to the receiver.

In another aspect, the present disclosure relates to distributing the file segments among m multiple locations, which may be chosen for storing the file segments until the time of their use. The locations may be randomly chosen. For example, in a data storage system such as a hard drive, storage area network (SAN), network-attached storage (NAS), or storage cloud, after the files are segmented and file segments are reordered according to the systems and methods herein, the resulting file segments would be stored on multiple systems in multiple physical locations, which would be reassembled into the file only on demand by a user or a consumer system. This is a novel on-time furnishing of a file by assembling file segments distributed across multiple systems and locations.

In another aspect, the present disclosure relates to systems for hierarchical analytics-based sparsification and obfuscation of data assets for security and privacy, which is based on hierarchical analytics of segment metadata. The systems filter out only relevant segments for reassembly, hierarchical analytics, quick search and summarization. Hierarchical analysis of files aids in improving the speed and effectiveness of analysis, and hardens the security of the data and computation both in transit and at rest. Specifically, these methods include intelligent segmentation (chunking) of the raw data files as well as hierarchical analytics on both raw files and segments for summarization of the essential data of interest for a given hypothesis or investigative context. For example, hierarchical analytic algorithms can be applied in bioinformatics. One of most widely used file formats for representing either nucleotide sequences or peptide sequences is FASTA format. Analysis of the raw sequence data is performed for the generation, testing, and validation of hypotheses. The systems and methods provided herein may be applied for the rapid analysis of the metadata of sequence data files in FASTA format. The systems and methods provided herein may be applied similarly to raw data files from, for example, Genebank, ABI, MDL, SAM/BAM, SFF, and PDB.

In another aspect, the present disclosure relates to methods applied where the server is unsecure, a user does not want the server to know her queries or the content of the files, and analytical capability is to be provided to the user. The system stores the file in encrypted format and an unsecure server does not have the key; therefore, the server does not have any information about the data before a query is made. To provide secrecy of the query, the queries are sent in an encrypted format which is then used to query the files. Additionally, the key used to encrypt the data may be dependent on a query term. This allows for the decryption of only that data that needs to be searched or matched without revealing any other data. Further, the inverted-indexes and hierarchical node information can also be kept in an encrypted format with all the searches performed on these structures. The indexes and hierarchy are pre-built on the client side and then sent to the server along with the remainder of the data. The complete architecture will then provide a fast, hierarchical search (fuzzy search) even on an insecure server.

Additionally, there are provided herein graphical user interfaces that may be implemented on software clients and may be displayed over a monitor. In an embodiment, some of the data utilized or displayed by the graphical user interface may be served by the file transfer server. The graphical user interface may show a listing of files for a particular workspace. The workspace may be associated with designated members, which may be identified by e-mail address logins. In an embodiment, a user of the graphical user interface may manage a workspace, such as by adding a designated member or by adding or deleting files from the workspace. It may be appreciated that a user using the graphical user interface on the source computer system may transfer a file to the recipient computer system by adding a file through selection of the file, which may add the file to the list by processing the file via a method disclosed herein. Accordingly, if a prior version of the file selected already exists in the workspace, the file segments transferred to the file transfer server may be limited to those file segments that contain updated data. In an embodiment, once a file is available on the file transfer server, a designated member using the graphical user interface on the recipient computer system may retrieve the file (i.e., creating a file copy) by selecting the desired file from the listing of files, which may retrieve and process the file segments via a method disclosed herein.

In additional aspects, one or more of the designated members may be administrators of a workspace, and may have greater user rights than other designated members. For example, in an embodiment, administrator members of the designated members may have the ability to add designated members via an indicator button on workspace, may delete the workspace, or may otherwise manage the actions that may be performed by certain designated members. In an embodiment, designated users may be owners of particular files in a listing of files, and thus may have greater ability to manage those particular files. For example, in an embodiment, an owner of a file may be able to delete the file from the workspace (e.g., delete the file from the file transfer server), or may be able to prevent modification of the file by other designated users.

Additionally provided herein are methods of analysis of the metadata of the file segments and the data contained in the segments resulting from triple encryption, segmentation and shuffling based security hardening. A method may comprise analyzing segment metadata for spurious activity and reporting of is as potential security breaching incidents.

Additionally provided herein are methods of triple encryption, segmentation and shuffling based security hardening performed on Payment Card chips (PCI) at the Point of Sale (PoS), portable disks (USB), laptops and similar devices in order to lock and harden security of the data on such single computer systems or storage systems at rest. Such methods may also be performed for Internet of Things (JOT) sensor device data streams, virtual machine (VM) files such as VHD, VMDK and the like, where an entire VM or VM appliance or container is processed through the same triple encryption, segmentation and shuffling based security hardening methods provided herein. Such methods may also be implemented on hardware as a security enhancing hardware device or in firmware as a security enhancing firmware device, as a secure layer middleware for Backup and Restore on SAN and NAS, or similar, storage networks/devices. Such methods may also be delivered as a single VM or appliance added, such as a Firewall VM, to any data transfer processes among two or more computer systems. For example, Cloud and Big Data workloads, and wherein this VM may be added for compliance with a law or regulation such as HIPAA, Sarbanes-Oxley Act (SOX), International Traffic in Arms Regulations (ITAR) and the like. Such methods may also be applied to harden the security of data transfers at the lower layers of the computer stack (layers L3 and below of the network) for packet-level application of triple encryption, segmentation and shuffling based security hardening method as a network layer appliance.

Additionally provided herein are methods for bidirectional data transformation. The transformation of the data in a file or file segment at the origin computing node is performed such that: the original data are first transformed to obfuscate their actual values and yet retain their contextual integrity and referential integrity, such that, for example, a Social Security Number after this transformation would still appear to be like a Social Security Number, while the actual digital values are obfuscated; and a mapping of the obfuscated data to the original data is always confidentially maintained at the origin computing node such that the destination computing node, after receiving the obfuscated (i.e., transformed) data will still be able to use the data as an input to search, query or otherwise reference back to the origin computing node. In the context of Cloud computing and Big Data analytics, this method enables highly secure, private and confidential sharing and searchability of a data file repository.

Additionally provided herein are methods for the effacement, scrambling or complete erasure of all or parts of the file after meeting certain configurable conditions in time or location, or otherwise, such as after the file reaching a certain time threshold or location.

Figure 1B:
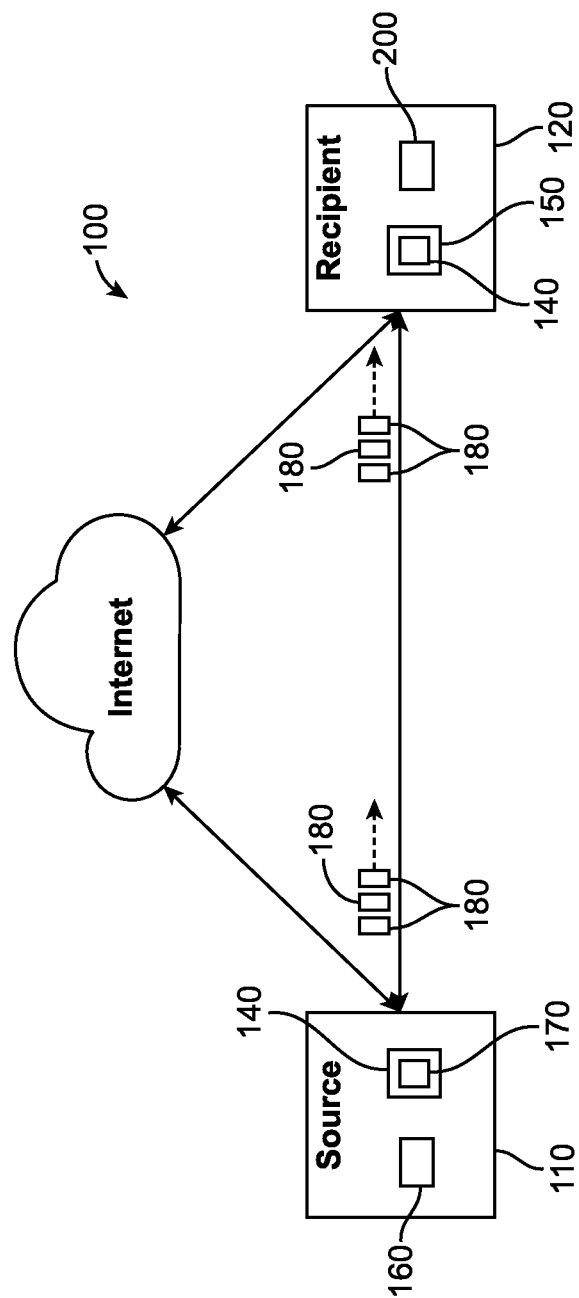
FIG. 1B illustrates a schematic embodiment of a networked computer system comprising a source computer system and a recipient computer system.

FIG. 1A illustrates a networked system 100 including a source computer system 110 and a recipient computer system 120 networked together with an intermediate file transfer server 130 operatively positioned therebetween, such that files may be transferred from the source computer system 110 to the recipient computer system 120 via the file transfer server 130. In an embodiment, the file transfer server 130 may receive and store secure segments of files (as described below) so that the segments of files may be shared with the recipient computer system 120 upon request by an authorized user at the recipient computer system 120. It may be appreciated that due to the nature of networked data transfer, in some embodiments each of the source computer system 110, the recipient computer system 120, and the file transfer server 130 may be coupled to a common network, such as the internet, which may route data as specified or desired by the source computer system 110, the recipient computer system 120, and the file transfer server 130. In an embodiment, the source computer system 110 may include an associated source processor 140, while the recipient computer system 120 may include an associated recipient processor 150. It may be appreciated that each of the source processor 140 and recipient processor 150 may be understood as comprising one or more computer processors in various embodiments, which may be configured to operate software to implement the methods and processes described herein.

As described below, a file 160 associated with the source computer system 110 may be located at the source computer system 110 (e.g., on a hard drive or solid state drive associated with the computer system 110). It may be appreciated that a file 160 may comprise a cohesive set of data, such as a text document (e.g., .txt, .docx, etc.), an image file (e.g., .png, .jpg, etc.), a spreadsheet (e.g., .xlsx), or so on. The file 160 may be processed by a software client 170 operating on the source processor 140, which may create file segments 180 that may be ultimately transferred to a software client 190 operating on the recipient processor 150, so that the file 160 may be reconstructed as a file copy 200 stored on storage associated with the recipient computer system 120.

Figure 2:
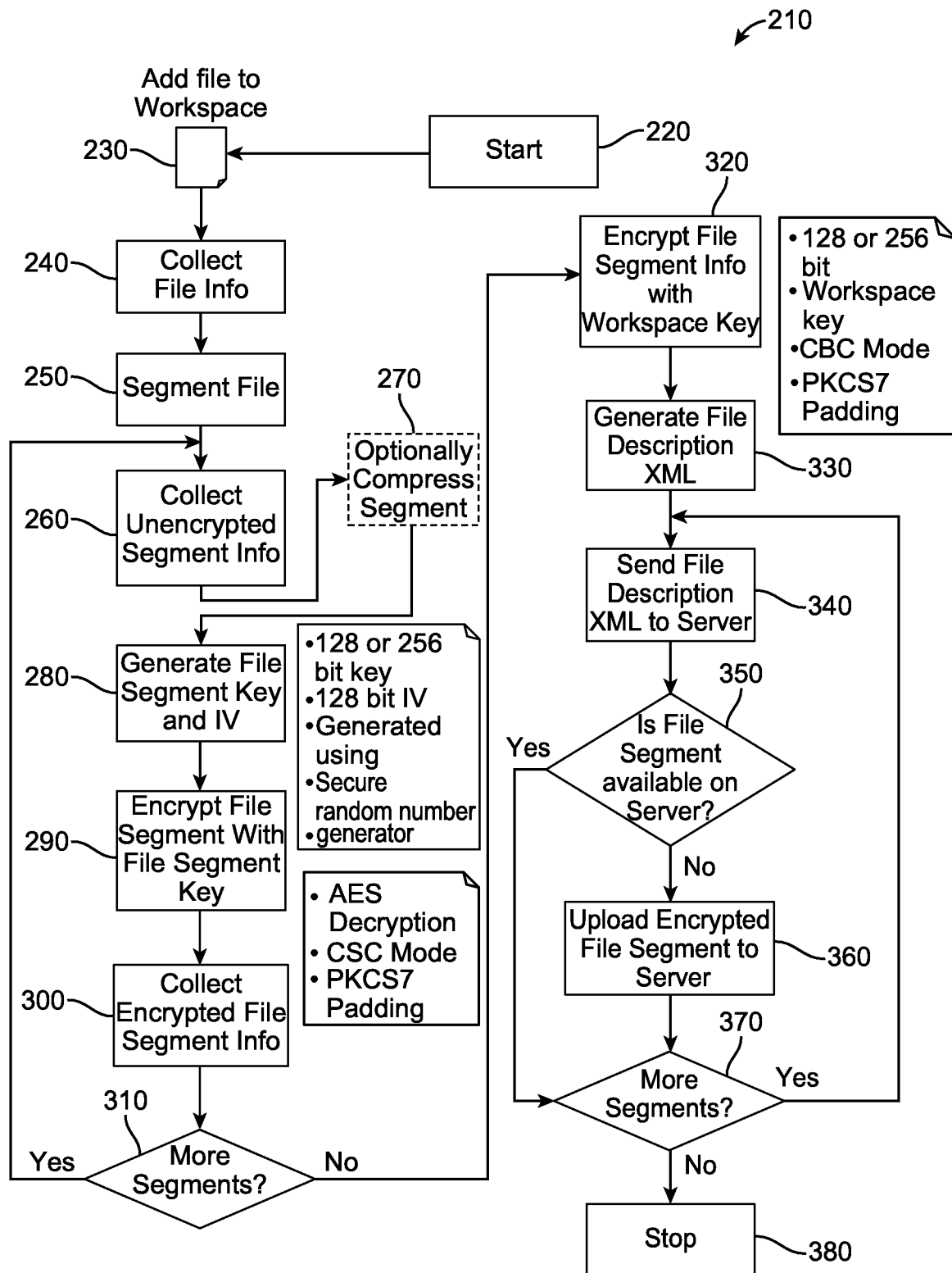
FIG. 2 illustrates an embodiment of a system or method for segmenting and encrypting a file that may be implemented on the networked computer system of FIG. 1A or FIG. 1B.

As described in greater detail herein, a method of transferring a file may include segmenting and encrypting portions of the file at a source computer system, and decrypting and combining the portions of the file at a recipient computer system. In an embodiment, the segmenting and encrypting of the file may be seen as a separate method from the decrypting and combining of the file segments. While the method of transferring the file may be implemented over the networked system 100, and as such reference will be made to the reference numbers of FIG. 1A herein, it may be appreciated that other systems may implement the method, and as such the method may be varied to be implemented on such alternative systems. Accordingly, FIG. 2 illustrates a method 210 of segmenting and encrypting the file 160. Accordingly, method 210 may start at 220, and include at 230 a user at the source computer system 110 adding the file 160 to a workspace. It may be appreciated that a workspace may be a listing of files across one or more of the source computer system 110, the recipient computer system 120, and the file transfer server 130, that may be accessed by designated users of the workspace. It may be appreciated that a user at the source computer system 110 may transfer the file 160 from the source computer system 110 to the file transfer server 130, where it may later be retrieved by a user at the recipient computer system 120, or the file may be transferred directly between the source computer system 110 and the recipient computer system 120. Accordingly, in an embodiment, the user of the source computer system 110 may select the file 160 and provide it to the software client 170 operating on the source processor 140. For example, the user may drag a graphical representation of the file 160 onto a representation of the software client 170 displayed on a graphical user interface at the source computer system 140. It may be appreciated that a portion of the graphical user interface may be associated with a particular workspace, which may designate the file as being associated with particular users (e.g., designated members of the workspace) or particular computer systems. In an embodiment, the user may select the file 160 from a plurality of files located in a library associated with the software client 170. In an embodiment, multiple files 160 may be selected, and may be processed as described herein either in series or in parallel to transfer the multiple files 160 from the source computer system 110 to the recipient computer system 120.

Once the file 160 is selected and identified by the software client 170, method 210 may continue at 240, where the software client 170 may collect information about the file 160. The information may include, for example, one or more of the name, location, type, size, date/time created, date/time modified, cryptographic hash for the file 160. Other information about the file 160 may additionally or alternatively be collected by the software client 170 as part of the information in other embodiments.

Once the file information is collected at 240, method 210 may continue at 250, where the software client 170 may divide the file 160 (or a copy thereof) into a plurality of segments 180 (e.g., segments of data, which may be data that makes up a portion of a particular version of a file 160). In an embodiment, the process of dividing the file 160 may comprise copying the file 160 into a plurality of file segments 180 (e.g., copying data from the file 160 into a plurality of file segments 180). In other embodiments, the process of dividing the file 160 may comprise cutting data out of the file 160, and placing the data into separate file segments 180. In an embodiment, the software client 170 may divide the file 160 into a number of file segments 180 each of a fixed size. For example, in one non-limiting embodiment the software client 170 may be configured to create file segments 180 of approximately 500 KB each. In other non-limiting embodiments, file segments 180 may be different sizes (e.g., 128 KB, 256 KB, 64 KB, and 4 MB), where the size of new file segments 180 may be selected at the time the new version of the file 160 is created. In an embodiment, if a change to a file version causes the relative location of a file segment 180 in the new version to move, the software client 170 may adjust the size of surrounding indexed file segments 180 to ensure that existing file segments 180 appear at the correct offset, which may save storage space on servers and transfer time and bandwidth for software clients such as software client 170 and software client 190.

In an embodiment, one file segment 180 may be smaller or larger than the remainder of the file segments 180, due to the file 160 not evenly dividing into a standard segment size. In an embodiment, the software client 170 may divide the file 160 into a fixed number of file segments 180. In an embodiment, where the software client 170 divides the file 160 into a fixed number of file segments 180, the number of file segments 180 may be determined by a threshold file size for the file 160 as a whole, wherein more file segments 180 are utilized the larger the file 160 is. As one non-limiting example, the file 160 may be divided into a first fixed number of file segments 180 when a file size is below a certain threshold, but may be divided into a second fixed number of file segments 180 when the file size is larger than the threshold. In an embodiment, the numbers of file segments 180 to be used may be based on where the overall file size falls in a set of pre-determined tiers, or based on a formula computation that utilizes the file size of the file 160. In some embodiments, the software client 170 may be configured to allow the user to select among various options for the number of file segments 180 to be used, the normal size of the file segments 180 to be used, or so on.

After a file segment 180 has been generated (e.g., copied from or created from the file 160), the software client 170 on the source processor 140 may process the file segment 180. As described herein, where file segments 180 are treated separately to enhance security associated therewith, the encryption of a given file segment 180 would not affect the encryption of another file segment 180. Accordingly, in various embodiments each file segment 180 may be processed (e.g., prepared and transferred) in series, or a plurality of file segments 180 may be processed together in parallel. In addition, in an embodiment, processing of a file segment 180 may occur as a file segment 180 is generated, but before all file segments 180 are generated. For example, the software client 170 may generate a file segment 180 and begin encrypting it while at the same time the software client 170 is generating the subsequent file segment 180. Similarly, in an embodiment, the software client 170 may generate a plurality of file segments 180 in parallel, and may then encrypt those file segments 180 in series or in parallel, while at the same time generating additional file segments 180 from the file 160. In an embodiment, parallel (e.g., simultaneous) preparation and/or transfer of file segments 180 may reduce the apparent transfer time of files 160 by utilizing available bandwidth.

As shown, in an embodiment, the processing of a file segment 180 in the method 210 may include at 260 the software client 170 collecting information about the file segment 180. As an example, the size of the file segment 180 may be collected (e.g., if not already known to the software client 170). In addition, in an embodiment, a cryptographic hash of the file segment 180 may be collected prior to encryption of the file segment 180, which may be used to verify proper transfer and decryption of the file segment 180, as discussed below. As shown at 270, it may be appreciated that in some embodiments, data compression of the file segment 180 may be applied after the information about the file segment 180 is collected, which may reduce the size of the file segment 180, may reduce the amount of bandwidth used to transfer the file segments 180 to the recipient processor 150, and/or reduce the amount of space used on intermediate servers such as the file transfer server 130 during the transfer of the file segment 180. For example, the file may be compressed by ZIP, GZIP, or so on. In an embodiment, compression would be performed before the file segment 180 is encrypted, which may result in the encrypted file segment 180 being smaller than the unencrypted/clear file segment 180. In an embodiment, the compression algorithm used to compress the file segment 180 may be included in the file description data.

In an embodiment, an encryption key and initialization vector may then be generated for the file segment 180, as shown at 280. It may be appreciated that the encryption key and the initialization vector may each be generated randomly, and that the key size may vary across embodiments. For example, in some embodiments the key may be 128 or 256 bits. It may be appreciated that the initialization vector may vary across embodiments. As an example, in an embodiment, the initialization vector may be 128 bits. In an embodiment, the random number generator may be configured to independently and randomly generate the encryption key and initialization vector for each file segment 180, such that the randomly generated key and randomly generated initialization vector are created without using any data associated with other file segments 180 (e.g., previously processed file segments 180). In an embodiment, the random number generator may be an algorithmically based pseudorandom number generator, which generates random numbers by repeatedly performing a mathematical operation that provides randomly distributed numbers. In another embodiment, the random number generator may be a true random number generator that generates random numbers through the measurement of non-deterministic physical processes (e.g. radioactive decay, electron tunneling through diode bridges, etc.).

In an embodiment, once the encryption key and initialization vector are randomly generated for the file segment 180, method 210 may continue at 290 with the source processor 140 encrypting the file segment 180 using the encryption key and initialization vector. In an embodiment, the initialization vector and encryption key may be used to perform encryption using cipher block chaining mode. This mode may use the initialization vector as an input to the encryption algorithm to insure that identical or nearly identical unencrypted file segments 180 are encrypted to non-identical encrypted file segments 180. This may insure that an attacker cannot use repeated patterns in the encrypted file segment 180 to deduce information about the unencrypted file segment 180. In an embodiment, the encryption of the file segment 180 may be performed using cipher block chaining. In an embodiment, the encryption may be performed using an electronic code book cipher. It may be appreciated that any number of public-key cryptography standards (PKCS) as understood in the art (e.g., as determined by RSA Security, Inc.) may be utilized in the encryption of the file segment 180, including but not limited to using PKCS7 padding. It may be appreciated that with utilization of separate encryption keys for each of the file segments 180, any compromising of a single file segment 180 would contain the infiltration to that file segment 180, without compromising the remainder of file segments 180. In an embodiment, the encryption algorithm and/or standard may be varied across file segments 180 in a given file 160. For example, in an embodiment, one or more file segments 180 may be encrypted using the Advanced Encryption Standard ("AES"), while one or more other file segments 180 may be encrypted using the Data Encryption Standard ("DES"). In an embodiment, AES, DES, DESede, or any other appropriate encryption algorithm may be used to create the encryption key for one or more file segments 180.

Once the file segment 180 is encrypted, the size of the file segment 180 and a cryptographic hash of the file segment 180 may be collected by the software client 170 operating on the source processor 140, as shown at 300 of method 210. It may be appreciated that each of these pieces of data may be used to ensure that the encrypted file segment 180 is properly transferred to the recipient processor 150, as discussed below. In an embodiment, the hash for each file segment 180 may be generated using algorithms such as SHA-256, SHA-1, and MD5. In an embodiment, where multiple hash algorithms may be used across a file 160, the hash algorithm for each file segment 180 may be included as part of the file description data.

The encryption of the file segments 180 may then continue until all file segments 180 have been processed. Once all file segments 180 have been processed, as determined at 310, the information collected from the file segments 180 both before and after being encrypted is combined and then is itself encrypted using a master workspace key associated with the workplace associated with the file (e.g., defining users who may access the file 160), as shown at 320. In an embodiment, the master "workspace" key may comprise a 128 or 256 bit AES key. In an embodiment, the workspace key may be shared for any file in a given workspace, and may be shared between the users who access that workspace. In an embodiment, a user of the source computer system 110 and a user of the recipient computer system 120 may both have access to the workspace key by virtue of being in the same workspace. In an embodiment, the workspace may be managed and administered by the file transfer server 130, as described in greater detail below. In various embodiments the encryption of the collected information may be performed using cipher block chaining (CBC) or an electronic code book (ECB) cipher. As with the encryption of the file segments 180 shown at 290, it may be appreciated that various PKCS features, such as PKCSS padding or PKC S7 padding, may be utilized in the encryption of the combined information. In an embodiment, the encryption algorithm, block mode (e.g., CBC or ECB), and padding mode for each file segment 180 may be included as part of the file description data.

After encrypting the collected information about the file segments 180 both before and after encryption thereof, the software client 170 may at 330 generate file description data that includes the metadata for the file 160, as well as a list of file segments 180 and the associated information for those file segments 180. In an embodiment, it may be appreciated that the file description data may itself be encrypted using the master "workspace" key. In an embodiment, the file description data may be generated as an XML file. As an example, Example 1 provides embodiments of unencrypted and encrypted file description XML for an example file 160. As shown, in an embodiment, the file description data may include a number of details for each file segment 180 (i.e., each "fileSegment" identified in the file description), including an index identifying the order of the file segment 180 (e.g., the "index" tag), a segment identifier (e.g., the "segmentID" tag), the size of the file segment 180 as encrypted (e.g., the "cipherTextSize" tag), the size of the file segment 180 as unencrypted (e.g., the "clearTextSize" tag), the cryptographic key (e.g., the "key" tag), the initialization vector (e.g., the "initializationVector" tag), the hash of the file segment 180 as encrypted (e.g., the "cipherHash" tag), the hash of the file segment 180 as unencrypted (e.g., the "clearHash" tag), and an identifier of a compression algorithm (if any) used on the file segment 180 (e.g., the "compresionAlgorithm" tag). In an embodiment, each of these identifying tags may be encrypted by the master workspace key. Additional details of the file 160 as it would be reassembled following transfer may also be included in the file description data. For example, as shown, owner information, a file size, date information, and a file hash may also be included in the file description data ("owner," "size" "date" and "hash" under the "version number" tag as illustrated), and one or more of these entries (e.g., "date" and "hash") may be encrypted in the encrypted file description data.

As shown at 340 in FIG. 2, method 210 may continue by the source processor 170 sending the file description data to the intermediate file transfer server 130, which may manage the transfer of the segments between the source computer system 110 and the recipient computer system 120. In an embodiment, the file transfer server 130 may comprise a database functionality (e.g., SQL) that may facilitate data storage and retrieval functionality as described herein. In an embodiment, the file transfer server 130 may manage storage of file segments 180 received thereat, as described in greater detail below. In an embodiment, once the file description data is received by the file transfer server 130, the file transfer server 130 may determine whether each encrypted file segment 180 is already present on the file transfer server 130, as illustrated at 350. Such determination may be useful when, for example, only a portion of a file 160's content has been updated, and as such, only a subset of the file segments 180 might change from prior versions, facilitating deduplication at file segment 180 level. In particular, a file segment 180 can be associated with a different version of a file 160 by referencing the existing file segment 180 (e.g., on the transfer server 130 or the recipient computer system 120), and associating that file segment 180 with the new version of the file 160 being transferred from the source computer system 110. Accordingly, it may be appreciated that some file segments 180 may already be present at the file transfer 130 in situations where multiple users have access to a workspace, where a file's content is merely being updated (e.g., a new version is being created, new data is being added to the end of the file, or so on).

In an embodiment, if the file segment 180 is not already at the file transfer server 130 (e.g., as determined by the encrypted and/or unencrypted hash, or other associated data), then the encrypted file segment 180 may be uploaded to the file transfer server 130, as shown at 360. In an embodiment, if the file segment 180 is present on the file transfer server 130, the file transfer server 130 may mark the already present file segment 180 as being current or otherwise in use. In an embodiment, the file segment 180 may similarly be associated with multiple workspaces if a similar file 160 (or versions thereof) is being used in each workspace. In an embodiment, determining the presence of an existing file segment 180 as being used for multiple files 160 or versions across the workspace or workspaces may allow common use, reducing the amount of data being used for storage (e.g., at the file transfer server 130), and reducing use of bandwidth, as such file segments 180 would not need to be transferred, but instead merely associated with multiple files 160 or versions. In an embodiment, such determination may be made based on metadata, hashes, or encrypted versions thereof depending on the user's key usage at the source computer system 110 or recipient computer system 120 (i.e., in a manner that maintains the secrecy of the file on the file transfer server 130 and from unauthorized users). In an embodiment, the file transfer server 130 may count or otherwise monitor the number of times a file segment 180 is being used (e.g., across multiple versions of files 160), so that it does not inadvertently delete a file segment 180 that is being used for other files 160. It may be appreciated that the process of transferring the encrypted file segments 180 from the source computer system 110 may occur in series or in parallel. Once there are no more file segments 180 to be uploaded to the file transfer server 130 (as determined at 370, such as with the file description data), then uploading of the file segments 180 from the source processor 140 to the file transfer server 130 may stop at 380.

It may be appreciated that the encrypted file segments 180 may be stored at the file transfer server 130 after being received from the source computer system 110. In an embodiment, the encrypted file segments 180 may be stored across a plurality of servers (e.g., the cloud). In an embodiment, the file transfer server 130 may perform routine basic storage and retrieval functions. In an embodiment, the file transfer server 130 may respond to requests from the source computer system 110 regarding the presence or absence of file segments 180 (e.g., when determining if the file segment 180 is available on the file transfer server 130, as in method 210 at 350). In an embodiment, the file description data may obscure from the file transfer server 130 the identity of the encrypted file segments 180. For example, while in an embodiment, the number of file segments 180 present in the file 160 being transferred may be accessible to one who has infiltrated the file transfer server 130, encryption of the identifiers of the file segments 180 may prevent an attacker knowing which file segments 180 at the file transfer server 130 are needed to recreate the file copy 200. Similarly, in an embodiment, metadata at the file transfer server 130 identifying the name, mime type, and/or size of the file 160 being encrypted in the file segments 180 may be encrypted in the file description data, preventing attackers or insiders with access to the file transfer server 130 from knowing such data for files 160 that a user has uploaded to the file transfer server 130 or otherwise is sending from the source computer system 110 to the recipient computer system 120. It may be appreciated that in some embodiments users may select whether or not to upload data such as name, size, and Mime type in the file description data as encrypted or unencrypted.

In an embodiment, the transfer of the file 160 from the source computer system 110 to the recipient computer system 120 may continue with the recipient computer system 120 receiving the encrypted file segments 180 from the server 130. It may be appreciated that receiving the file segments 180 may be initiated by a number of mechanisms. For example, in an embodiment, the file transfer server 130 may notify the recipient computer system 120 that new file segments 180 are available, associated with a workspace to which the recipient computer system 120 subscribes. In an embodiment, the recipient computer system 120 may poll the file transfer server 130, and ascertain that an update to the file 160 as identified in the workspace is available. In an embodiment, the transfer to the recipient computer system 120 may be automatic based on the transfer from the source computer system 110. For example, in an embodiment, the file transfer server 130 may automatically prompt the recipient computer system 120 to begin receiving some or all of the file segments 180 upon their transmission from the source computer system 110. In an embodiment, the source computer system 110 may transfer one or more of the file segments 180 directly to the recipient computer system 130, bypassing the file transfer server 130. Accordingly, in an embodiment, the transfer management functionality of the file transfer server 130 may be provided by either or both of the source computer system 110 and the recipient computer system 120, so as to facilitate transfer of the file 160 therebetween.

Figure 3:
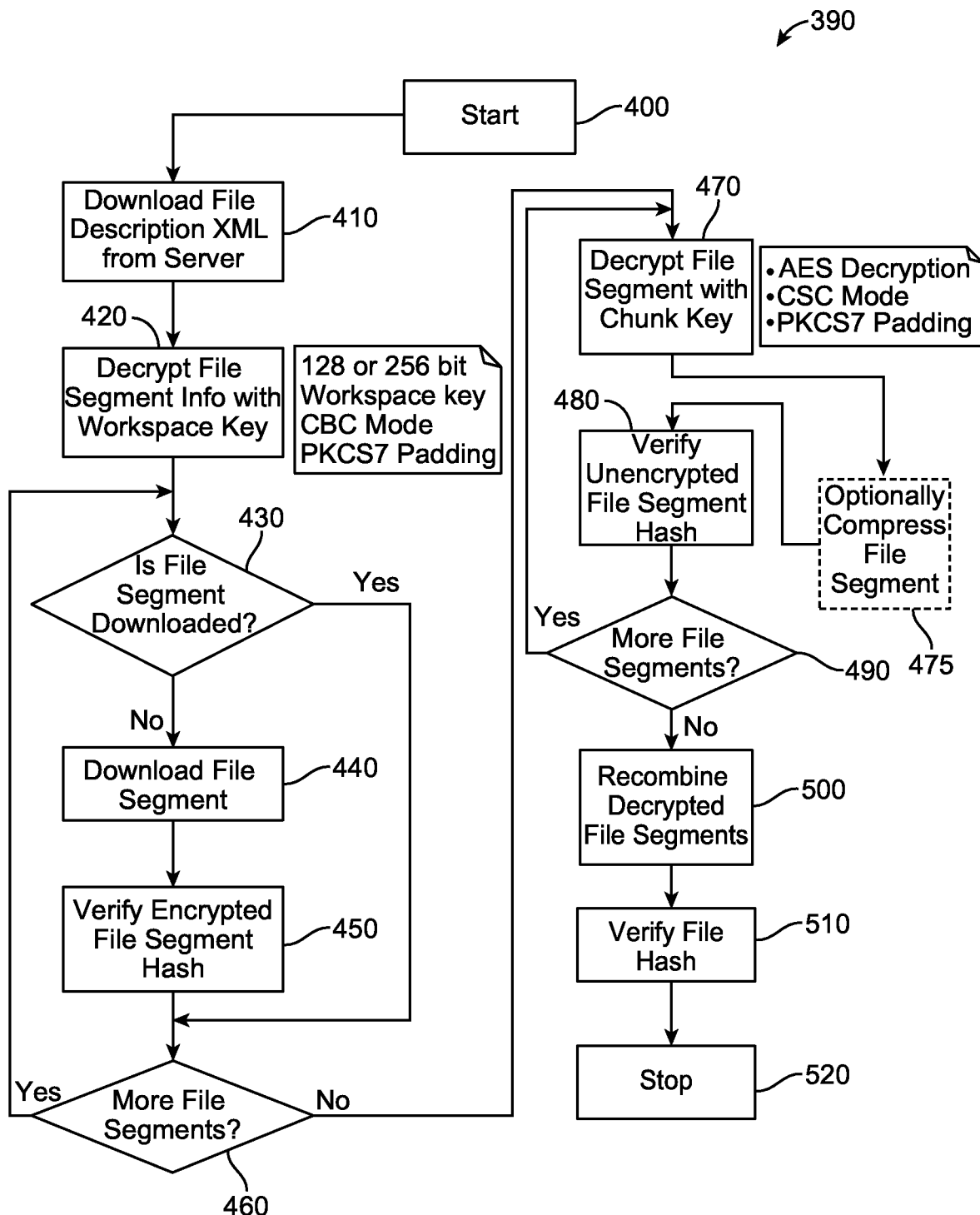
FIG. 3 illustrates an embodiment of a system or method for decrypting and recombining encrypted file segments that may be implemented on the networked computer system of FIG. 1A or FIG. 1B.

As such, in an embodiment, the software client 190 operating on the recipient computer processor 150 at the recipient computer system 120 may be configured to perform a method 390 of decrypting and combining the encrypted file segments 180 received thereat, as illustrated in FIG. 3. In an embodiment, the method 390 may start at 400, and continue at 410 with the software client 190 downloading the file description data generated at 330 and uploaded to the file transfer server 130 at 340 in method 210. After receiving the file description data, the software client 190 may at 420 use the workspace key to decrypt the collected information about the file segments 180 that was encrypted by the source computer system 110 at 320 of method 210.

After decrypting that information about the file segments 180, method 390 may continue by retrieving the file segments 180. In an embodiment, the retrieval may comprise, at 430, determining whether a particular file segment 180 is already present at the recipient computer system 120. For example, when performing segment level deduplication, certain file segments 180 may software client 190 may already be current at the recipient computer system 120, and thus would not need to be re-downloaded. In an embodiment, determining if the file segment 180 is located at the recipient computer system 120 at 430 may comprise comparing a file segment identifier in the file description data with information regarding the file segments 180 located at the recipient computer system 120. For example, the file segment identifier may identify one or more of the file name of the file segment 180, the encrypted hash of the file segment 180, the file size of the file segment 180, or so on. In an embodiment, the file segment identifier may uniquely identify a file segment 180 in the system (e.g., in the file transfer server 130). In an embodiment, to avoid duplicative file segment identifiers, file segment identifiers may be relatively long (e.g., 256 bits). In an embodiment, the file segment identifies may be generated using the SHA-256 algorithm, and may use details about the file segment 180 such as the hash of the unencrypted file segment 180 and the size of the file segment 180 as inputs.

If the file segment 180 is not on the recipient computer system 120, the method 390 may continue at 440 by downloading the file segment 180. As indicated above, while the file segment 180 may be received from the file transfer server 130, in an embodiment, the file segment 180 may be received from the source computer system 110, the cloud, or any other designated storage place. The file segments 180 may be placed into a local storage cache at the recipient computer system 120, or any other storage location associated with the recipient computer system 120. Once downloaded at 440, or if it is determined at 430 that the file segment 180 is already present at the recipient computer system 120, method 390 may continue at 450 by verifying the hash of the encrypted file segment 180, which may determine that the file segment 180 has been downloaded correctly. As shown, the steps of downloading encrypted file segments 180 and verifying their hash's may continue until all encrypted file segments 180 are processed, as determined at 460.

Once all file segments 180 are present at the recipient computer system 120, the method 390 may enter into a loop of processing each encrypted file segment 180. For example, as shown at 470, each file segment 180 may be decrypted with the key associated with that file segment 180 that was stored in the encrypted file description data received at 410 and decrypted at 420. In an embodiment, where the file segment 180 was compressed prior to the encryption thereof (e.g., at 270 in method 210), method 390 may continue at 475 by decompressing the file segment 180. In an embodiment, the compression algorithm used to compress (and subsequently decompress) the file segment 180 may be included in the file description data. Once the file segment 180 is decrypted, and decompressed if originally compressed, method 390 may continue at 480 by verifying the unencrypted file segment 180 has been correctly decrypted by verifying the hash of the unencrypted file segment 180, as was stored in the file description data. In an embodiment, a new hash may be computed for the file segment 180 as decrypted, and compared with the hash generated prior to encryption of the file segment 180 at the source computer system 110.

It may be appreciated that method 390 may continue to process all file segments 180 until a complete set of unencrypted file segments 180 are present at the recipient computer system 120, as determined at 490. Method 390 may then continue at 500 by recombining the decrypted file segments 180 into the reconstructed file copy 200 at the recipient computer system 120. In an embodiment, the order of reconstruction at 500 may be determined through the file description data, which may include an index number for each file segment 180.

Once the file copy 200 is recreated, method 390 may continue at 510 by verifying the file hash of the file copy 200, comparing the hash of the file copy 200 with that of the original file 160 (the hash of the original file 160 being transferred in the file description data). In an embodiment, where a cryptographic hash of the file 160 that is to be transferred was collected by the software client 170 operating on the source processor 140, verification that it was correctly received and reassembled as the file copy 200 at the recipient processor 150 may be performed by generating a new cryptographic hash of the file copy 200, and comparing the cryptographic hash of the reconstructed file copy 200 with the cryptographic hash of the file 160 from the source processor 140. After verifying that the original file 160 on the source computer system 110 has been reconstructed as the file copy 200 on the recipient computer system 120, method 390 may end at 520, such as by making the file copy 200 available to the user of the recipient computer system 120.

As noted above, in an embodiment, different versions of files 160 may be understood by the software client 170 so as to transfer file segments 180 that correspond to portions of files 160 pertaining to updated data. It may be appreciated that in an embodiment, different versions of files may be otherwise interpreted by the software client 170 and/or the file transfer server 130, so as to facilitate tracking of updates to a file 160 as individual versions. In an embodiment, a user may retrieve a list of all versions of a file in a workspace (e.g., one that has been or will be uploaded to the file transfer server 130, or is otherwise shared across the source computer system 110 and the recipient computer system 120). In an embodiment, version information associated with a file 160 may include the size, modification date, uploading user, and/or other associated tags for the file 160. In an embodiment, a recipient user may request older versions of a file 160 to reconstruct an older version of the file 160 as the file copy 200. In an embodiment, a user may remove older versions of the file 160 from the workspace by selecting such older versions for removal.

In an embodiment, different versions of files 160 being shared in the workspace may have different tags associated therewith. For example, a system tag may be generated by the software client 170 when the file is being uploaded to the workspace, and may include details regarding where the file 160 originated from, or details associated with data loss prevention ("DLP"). In an embodiment, user tags may be associated with a file 160, which may be added by users after a file version has been created by the originating user. In an embodiment, such user tags may be automatically propagated to future versions of the file. In an embodiment, user tags may be public, so that all users with access to the file in the workspace may see the tag, and may modify the tag(s). Such tags may include, for example, "Proposal," "For Review," or "Final" in some embodiments. In an embodiment, user tags may be private, and may be only visible to and/or modifiable by the user applying the tag. In an embodiment, the originating user (e.g., the "owner" of the file) may apply tags that are visible to other users, but are not modifiable by those users.

It may be appreciated that the processes associated with each of the source processor 140 and the recipient processor 150 may occur at least partially in the memory or cache associated with the source processor 140 or recipient processor 150 respectively in some embodiments. For example, generating the file segments 180 from the file 160 into may temporarily store the file segments 180 in memory or cache associated with the source processor 140 until being transferred. Similarly, receiving the file segments 180 at the recipient processor 150 may store the file segments 180 in memory or cache associated with the recipient processor 150 temporarily until being recombined into the file copy 200.

Those skilled in the art will appreciate that the embodiments described herein can be implemented using a server, computer, database, communications and programming technology, each of which implements hardware or software or any combination thereof. Embodiments of this disclosure may be implemented in the form of a computer program product on a computer-readable storage medium having computer-readable program code means embodied in any suitable computer-readable storage medium, including hard disks, CD-ROM, RAM, ROM, optical storage devices, magnetic storage devices, and/or the like.

Figure 4:
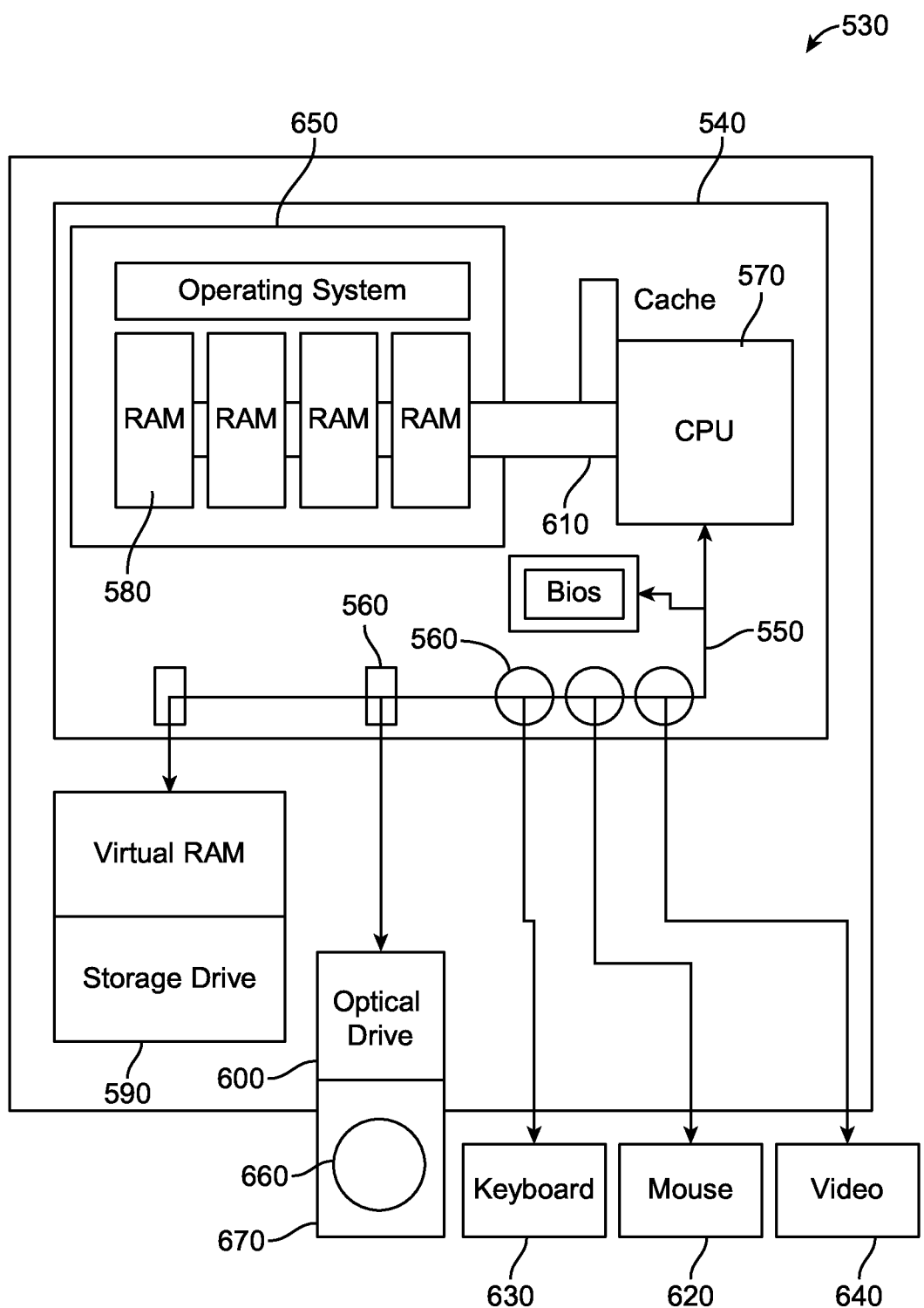
FIG. 4 illustrates an exemplary computer system configured to perform the functions of systems and methods described herein.

For example, FIG. 4 illustrates a high level block diagram of an exemplary computer system 530 which may be used to perform embodiments of the processes disclosed herein, including but not limited to processes 210 and 390, data storage and retrieval functions of the file transfer server 130. It may be appreciated that in some embodiments, the system performing the processes herein may include some or all of the computer system 530. In some embodiments, the computer system 530 may be linked to or otherwise associated with other computer systems 530, including those in the networked system 100 (e.g., the source computer system 110 and/or the recipient computer system 120), such as via a network interface (not shown). In an embodiment, the computer system 530 has a case enclosing a main board 540. The main board has a system bus 550, connection ports 560, a processing unit, such as Central Processing Unit (CPU) 570, and a data storage device, such as main memory 580, storage drive 590, and optical drive 600. It may be appreciated that where the computer system 530 serves as the source computers system 110 or the recipient computer system 120, the CPU 570 may serve as the source computer processor 140 or the recipient computer processor 150 respectively. Each of main memory 580, storage drive 590, and optical drive 600 may be of any appropriate construction or configuration. For example, in some embodiments storage drive 590 may comprise a spinning hard disk drive, or may comprise a solid-state drive. Additionally, optical drive 600 may comprise a CD drive, a DVD drive, a Blu-ray drive, or any other appropriate optical medium.

Memory bus 610 couples main memory 580 to CPU 570. The system bus 550 couples storage drive 590, optical drive 600, and connection ports 560 to CPU 570. Multiple input devices may be provided, such as for example a mouse 620 and keyboard 630. Multiple output devices may also be provided, such as for example a video monitor 640 and a printer (not shown). In an embodiment, such output devices may be configured to display information regarding the processes disclosed herein, including but not limited to a graphical user interface facilitating the file transfers, as described in greater detail below. It may be appreciated that the input devices and output devices may alternatively be local to the computer system 530, or may be located remotely (e.g., interfacing with the computer system 530 through a network or other remote connection).

Computer system 530 may be a commercially available system, or may be proprietary design. In some embodiments, the computer system 530 may be a desktop workstation unit, and may be provided by any appropriate computer system provider. In some embodiments, computer system 530 comprise a networked computer system, wherein memory storage components such as storage drive 590, additional CPUs 570 and output devices such as printers are provided by physically separate computer systems commonly tied together in the network (e.g., through portions of the networked system 100). Those skilled in the art will understand and appreciate the physical composition of components and component interconnections comprising computer system 530, and select a computer system 530 suitable for performing the methods disclosed herein.

When computer system 530 is activated, preferably an operating system 650 will load into main memory 580 as part of the boot sequence, and ready the computer system 530 for operation. At the simplest level, and in the most general sense, the tasks of an operating system fall into specific categories—process management, device management (including application and user interface management) and memory management.

In such a computer system 530, the CPU 570 is operable to perform one or more methods of the systems, platforms, components, or modules described herein. Those skilled in the art will understand that a computer-readable medium 660, on which is a computer program 670 for performing the methods disclosed herein, may be provided to the computer system 530. The form of the medium 660 and language of the program 670 are understood to be appropriate for computer system 530. Utilizing the memory stores, such as one or more storage drives 590 and main system memory 580, the operable CPU 570 will read the instructions provided by the computer program 670 and operate to perform the methods disclosed herein.

Accordingly, in an embodiment, the CPU 570 (either alone or in conjunction with additional CPUs 570) therein, which may be configured to perform file encryption and segmentation and/or the file segment decryption and recombination processes described herein (e.g. methods 210 and 390). In an embodiment, the CPU 570 may be configured to execute one or more computer program modules, each configured to perform one or more functions of the systems, platforms, components, or modules described herein. It may be appreciated that in an embodiment, one or more of the computer program modules may be configured to transmit, for viewing on an electronic display such as the video monitor 640 communicatively linked with the CPU 570, a graphical user interface (which may be interacted with using the mouse 620 and/or keyboard 630). In an embodiment, the graphical user interface may be configured to facilitate reception of user input data for sharing of the electronic files among the source computer system 110, the recipient computer system 120, and the file transfer server 130.

Figure 5A:
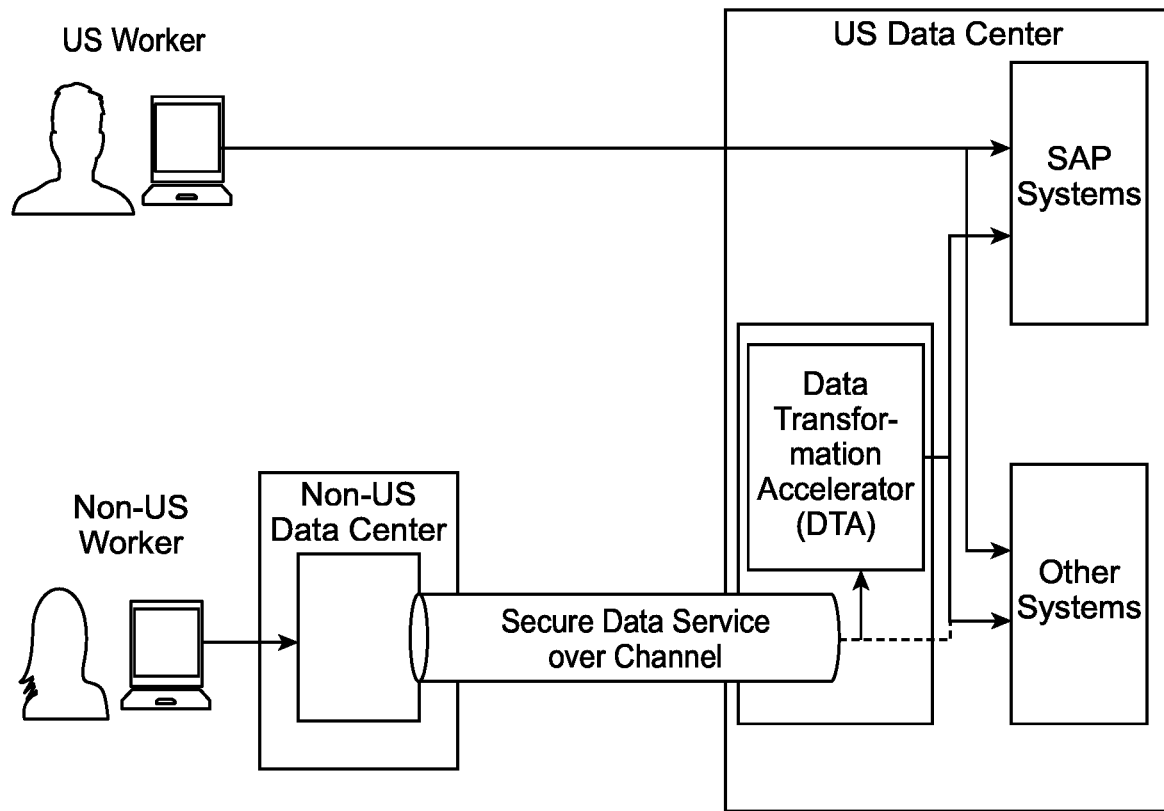
FIG. 5A illustrates an embodiment of a system or method for security hardening as described herein.
Figure 5B:
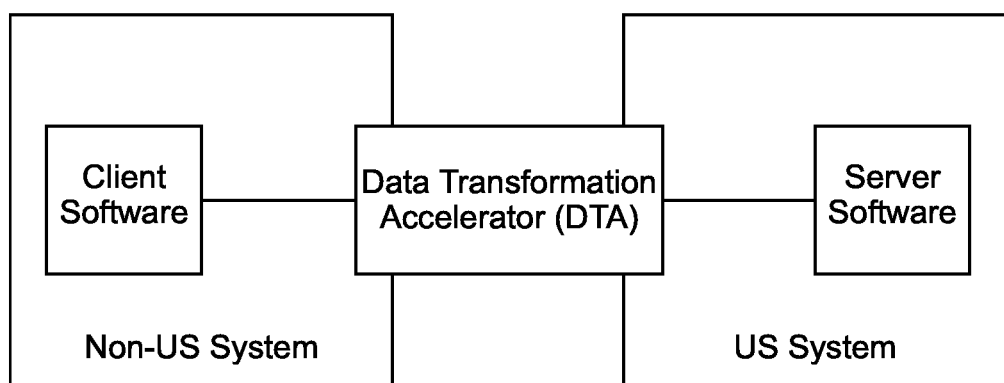
FIG. 5B illustrates an embodiment of a system or method for security hardening as described herein.
Figure 6A:
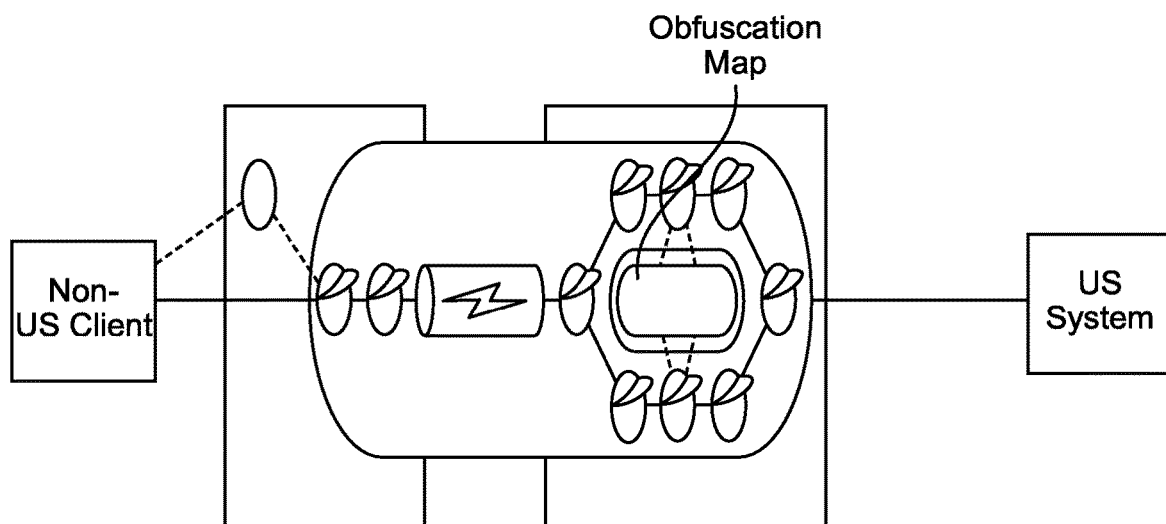
FIG. 6A illustrates an embodiment of security hardening by bidirectional data transformation using obfuscation.
Figure 6B:
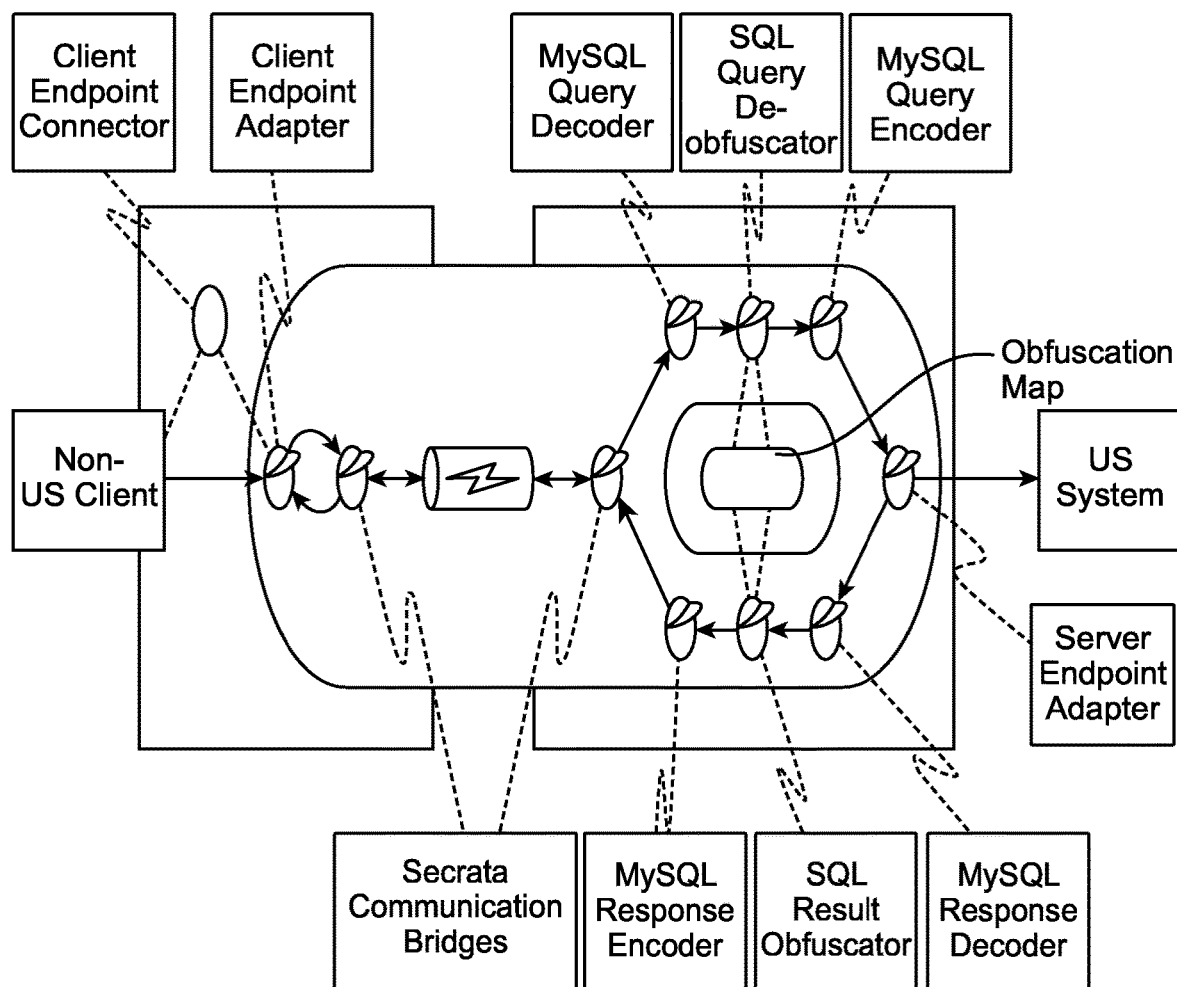
FIG. 6B illustrates an embodiment of security hardening by bidirectional data transformation using obfuscation.
Figure 7:
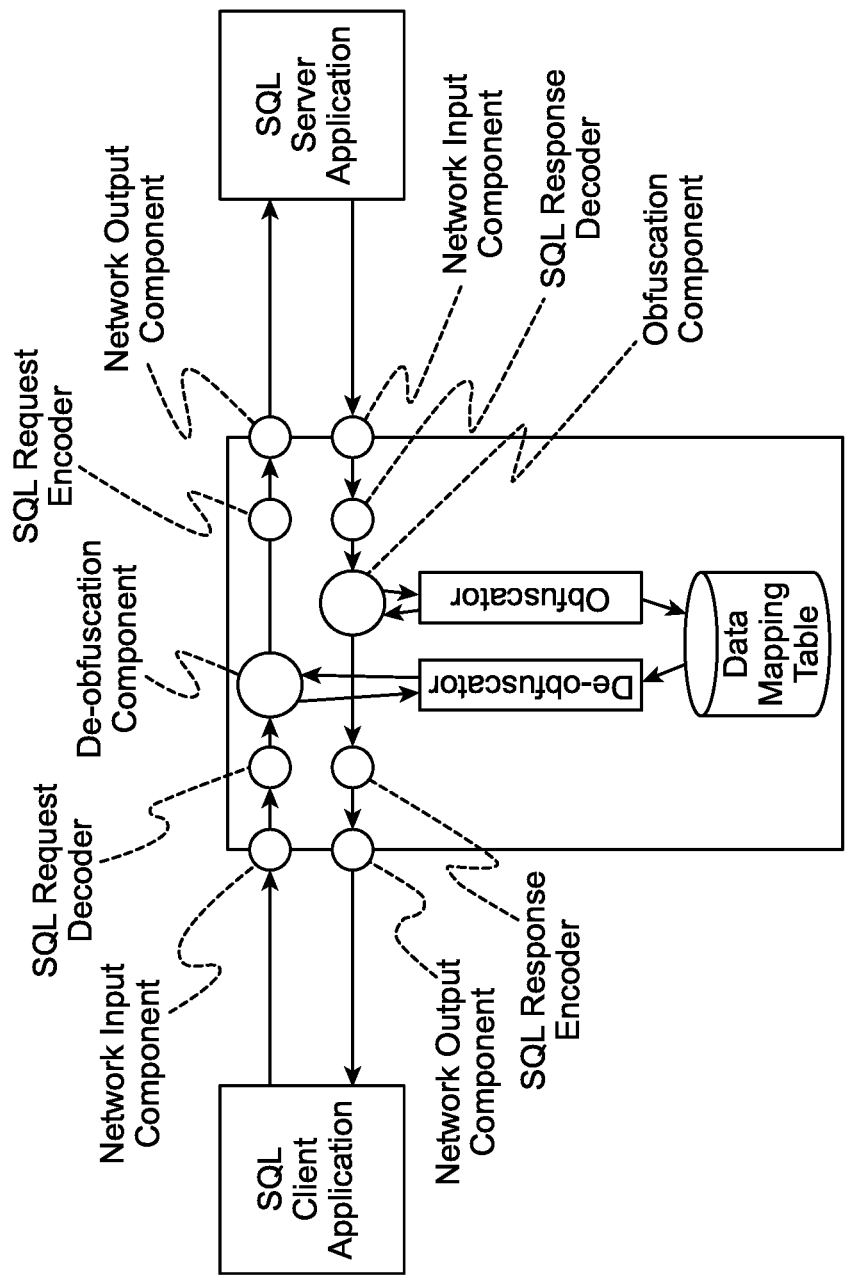
FIG. 7 illustrates an embodiment of configurable data transformation accelerator, which may be implemented at the lower (SQL) level, with optional bi-directional obfuscation.

FIG. 5A and FIG. 5B illustrate an exemplary embodiment of bidirectional data transformation accelerator for hardening the security, confidentiality, and privacy of a file in transit within an exemplary platform's multiple geographical locations. FIG. 6A and FIG. 6B illustrate a method for hardening the security, confidentiality, and privacy of a file, the method comprising obfuscating at a first computer system digital values of the file in order to generate corresponding obfuscated digital values of the file, wherein the obfuscated digital values of the file retain their contextual integrity and referential integrity; and mapping the obfuscated digital values of the file to the digital values of the file; transferring the obfuscated digital values of the file to a second computer system; using the obfuscated digital values of the file as an input to search, query, or otherwise reference back to the first computer system. FIG. 7 provides an additional, non-limiting embodiment.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

Example Aspects—File Segmentation, Triple Encryption, and Obfuscation

The software and system on the origin computing node (commonly known as the client) perform the operations described herein in order to segment, triple encrypt, and obfuscate a file. Segments are encrypted using randomly generated AES encryption keys and initialization vectors. Additionally, their contents can also be obfuscated via data masking for additional security hardening. File Description XML Document fields are encrypted using Workspace or Transfer Keys that are shared with all users that are to have access to the file. Workspace Keys are encrypted using the Public Key of each member of a workspace when they are invited to join the workspace.

In the present example, it is indicated that a file should be securely transferred. The user is present with the option to select the file in a dialog box or drag a file onto the application window. The user is also presented with the alternative to elect the file to be chosen automatically by the system in response to alternative input. Following this indication, the file metadata is collected. The file metadata comprises name, last modification date, size, or cryptographic hash, including the chosen hashing algorithm.

The file payload is then broken into segments. In the present example, the segments are all of the same size. However, it is not required that they be so. An option to randomly assign the file segment size is provided to the user. Further, there is an option to distribute the segments in order to be stored as subsets in multiple randomly chosen locations. Such dispersion achieves additional security hardening. Optionally, contents of the segments can be redistributed in order to achieve shuffling of the contents contained among different segments. For example, distributing every $i^{th}$ set of <N> bits from each segment into the segment number i, where i=0 to N is the number of segments. This exemplified shuffling scheme ensures that partial contents from all segments are present in every segment. This further enhances the security of the method described in the present example. A unique segment ID for the segment is created. Segment IDs are typically 256 bits long represented as Hexadecimal strings.

The unencrypted segment metadata is then collected. Such metadata may comprise size and cryptographic hash (including the chosen hashing algorithm). The unencrypted segment is compressed using a supported compression algorithm. In the present example, the unencrypted file description data is embodied as:

```
<?xml version="1.0" encoding="UTF-8"?>
<fileEntry>
<url>https://constantine.skootit.com/restapi/cloudview/files/50db9782-ff40-423b-9b77-010c29182d34</url>
<referenceID>cloudview:jmorgan2</referenceID>
<entryID>50db9782-ff40-423b-9b77-010c29182d34</entryID>
<name>CRW_6271_medium.jpg</name>
<parentID/>
<isFolder>false</isFolder>
<mimeType>ENC:KJ0Rtx6zsaeI1T2yUJOB/ekNFnJyUwDzOJRU8n5CsmWuGyUfjzZxDOzeoJFe61T2</mimeType>
<version number="1">
<owner>c03d811e-e53a-443c-affb-62789be25289</owner>
<size>1946893</size>
<date>ENC:T3573udeBx1yNn4oj601XcbTLBa7UVhd5DybUObS6bk=</date>
<hash>ENC:3mDpH9svbkuMqvWEkZ4py1pkVRyRf4xJImI9Or3qF/tA7f5CL9FhQnJZug4RAoNnQijTke/Z8Gap/fT1qMsYFydF35T7Xd+L+Eeq0Ca1TGg=</hash>
<userTags>
<tag scope="public">foo</tag>
<tag scope="private">bar</tag>
<tag scope="public">1395340861556</tag>
</userTags>
<systemTags>
<tag scope="SYSTEM">PII-1395340861556</tag>
<tag scope="SYSTEM">PKCS-1395340861556</tag>
</systemTags>
<fileChunks>
<fileChunk>
<index>0</index>
<chunkID>ENC:w81mGihbCrUiD5GP3KI/xjGcvN9B11MbZ4bkY8ffZgeG+Yqwoz5e604y0+UnP0Bq11hQ/Ct0EhXCH4MqelAG17BNgKl+E1jqydzqxrdyG5Oxcbmrpxm9ZzKE2RV872Cz</chunkID>
<cipherTextSize>ENC:LN3Dg3p4VBuiUmQp9GHzhB0tDHO7Qj6AhhRw8W1I40M=</cipherTextSize>
<clearTextSize>ENC:Shf9pxT0oZk6GgJDuBzmAa1iayCocFOcH1vJp/bTiPs=</clearTextSize>
<key>ENC:s8ggd88YNYpSWYypiF/5PCG8cfZuGHgJm4Bv/bD/z+I4k2UKTU43cuptyfiXYXNAvA3X7jMYM6gw1WJwlnRzrw==</key>
<initializationVector>ENC:sl3mtauRXwy8HAoLATSJEGE+SXiVPmwk6+9M92FxfTsV9i9NSllZmYOzMpMHxT7x</initializationVector>
<cipherHash>ENC:ak43+0qJGrqHfzb5UMkjCq1KPRJT3YR7kbAcv4ZMocdKKVrJejj91YjhF1JWrV+dN0jiPJXFA134z4fiEaPktaKsX56gGaQ6qNBHqta5tTM=</cipherHash>
<clearHash>ENC:vmCv8gQbJWP1HoTUCBRn5qKFU7bf9Kz13IjqX6QPQquHd5OKY1105HOfymxgNwk7VfC4oBDjDMyW2T+JT4CK5I1s3kO4g39ZgLmj9LfplGU=</clearHash>
<compressionAlgorithm>ENC:ZV0ToswP+woAzYML/pWXU3cdBYYCWQyTvs036TmrcX4=</compressionAlgorithm>
</fileChunk>
<fileChunk>
<index>1</index>
<chunkID>ENC:wkBJQRrIlGRZ0ZkkeDykmapzihNUgglWSKse3zdtewn7sIdTMZNJGvq0UzJwY6oQsTH/dUIOkcNMz5LHTMVOq2pIxBm6Gop2tYdbBmaWhlSOyMBqu02ZanW2sXN654P6</chunkID>
<cipherTextSize>ENC:WRfIuPm2pTwVq9363G9oMOiNECPGCfPR3EeEyKRZUiw=</cipherTextSize>
<clearTextSize>ENC:DIXQJAqgr7nN1I1uFsKMV0007usWA1jXLMg8lcJtLRs=</clearTextSize>
<key>ENC:nLVDSCjSXTGqBLsewJeGcjEy8KyEftSbTY0PY++7MOrbkrC9AkyZib26GkKchAJOESAtfILSmaKt/dtoL46JrQ==</key>
<initializationVector>ENC:fRuJJliDhLXwT8JlpctCKQec7mbNTQpJmkufbYGc9fBqPXS02TwpMiwkdOEAXvNz</initializationVector>
<cipherHash>ENC:NRg+BD/xvfLn1RjRAS8M1i+TwkUJJ+vMvIIL8uHKervwZ1hFLzCk7JU45K40wl4tLbmegKIrAkXohcUOcuYug+kNq055VGc0yo9ag20K/sM=</cipherHash>
<clearHash>ENC:pWrWEG9ayjvSepF5+csxc2L0EkCUtznvri2yxM7y9JKt2JMHP6/1bJvIcXHCPi1yNNC7DBvRCs4l40kphOOJouRumUVmJJKHuASi2zc2j9c=</clearHash>
<compressionAlgorithm>ENC:rAsAJUzXq5kpSn5mX6wQGkUqPXQE/vxJIZ8l+YuwFcY=</compressionAlgorithm>
</fileChunk>
<fileChunk>
<index>2</index>
<chunkID>ENC:MdqAEOiJ9+wBunGKYEiPklTt22r0uPP1p/pwwwiaWC1rgFG2Rmy73YeW9LoORygXODc79tdl7KRI0XCq7qKbNs3ZRBsTr4B4f0U40x5SiOh7+jBAHC6x+QlttOAaTn0U</chunkID>
<cipherTextSize>ENC:QnfdREyle8EhpAQSxVR/Asx4qXGpY1WkLMAEWZqTVIg=</cipherTextSize>
<clearTextSize>ENC:IuA0L0lWFqu+eVpA3OQiuwutcWDji5R5vB+dCN38tfQ=</clearTextSize>
<key>ENC:QDJuYD8GlHWdt6cthfMHjNlRzIFpWYG3QFfRB6LoRHyBfauuAtbN5d0F2yuGk
```

```
6cKxmcfpUD4gVgWL5cl6sCH5w==</key>
<initializationVector>ENC:OsCgaZBpgT1QiLLZSeTsvc0xEAfS3uwEj+riRB9biz4HMLISDWk
Z9mIia89dQJNS</initializationVector>
<cipherHash>ENC:YouDAsj+rJIsQq5ojCbjxTy+yCSaavSo50/OQB7XNQQn1m1Dt35YejsRzI+
qU/49nDIrpumL455+BVQeTRuXHaOwW3B/Lvs9oU2J4VLM5nc=</cipherHash>
<clearHash>ENC:3CJK11XvZ/mglzFmFyCsoWn7MW4hSmHeDiC922C7K5FCXd2+SWpO/b
DrbPP72UN0q5NKmfeOn9U+PcGG0tXA3wBj3J4iWUmk18Aj97xEdOk=</clearHash>
<compressionAlgorithm>ENC:hHXHlUavOK5mYO5gkqGuwTsFbjr01b0UgWcr9mvi3AM=</c
ompressionAlgorithm>
</fileChunk>
<fileChunk>
<index>3</index>
<chunkID>ENC:pMrAdflkuMxNcExfqKe/6N16Dze4Y3A5MfuN2K+EkyL24smzkJcYYk6y7s
Z86mBCCVpU+fjkb4x8j33WL/ZKmOXPH3MW79S7yxG8Tj+0R3nFUpxeGFe97WaKQwf/g/
80</chunkID>
<cipherTextSize>ENC:ooEj0iTul82jLnKiEfmHfkJj9A5Ptb2BbjUYGEo1ZQA=</cipherTextSiz
e>
<clearTextSize>ENC:Il6qdJ9k56EZPdJlSxxAFYrCRBzF7AIZzdqR1WyMFw4=</clearTextSiz
e>
<key>ENC:yTbF2tpgeuM0RYC/F5xmxI4nB3gxz4LhpuJBcntndp1+YnDeNYBa7nmHB21PKZ
+17rUTlGpo3hmC1josiNdFyg==</key>
<initializationVector>ENC:BwNJS7nPlrO0v0Jb89007TNu1LdlDd2bDPhtDlPmrICuil0Lze4Mcl
nA+uHPYjta</initializationVector>
<cipherHash>ENC:SenhaWv683gxMIb6kdgNaL0FIuPgYY6G9sSUa6XGjRTvDWCUFh4eKG
9U1jrF7FxlXAvSpcHJzKyv2vnihVOvsFTMXkG6x6tQqxVkBBNMrQY=</cipherHash>
<clearHash>ENC:25fKdQEwDkDzVpLMzo09L5plf2RRx4/JSWpYi6T4E7fSIai2znP7WRp5JG
pIW9fGonFLnT6Csc7gr0U9zw5hp7s8t+EPXAVbrJdJCA55Sko=</clearHash>
<compressionAlgorithm>ENC:r7s1pztTwQ/QXUerLdxinA1hvwhUETrK7fCKFrWd6N4=</co
mpressionAlgorithm>
</fileChunk>
</fileChunks>
</version>
</fileEntry>
```

A unique AES segment encryption key and initialization vector are generated. 128-bit keys may be used, but longer keys are useable assuming all clients are able to support the larger keys. In addition, other algorithms may be used provided those algorithms are supported by all of the clients. In the present example, the algorithm 3DES is used.

The unencrypted, compressed segment is encrypted using the segment encryption key and initialization vector. In the present example, the encryption is performed using Cipher Block Chaining (CBC) mode to insure that repeated data does not leak information within the segment. The encrypted segment metadata is collected. Metadata may comprise size and cryptographic hash (including the chosen hashing algorithm). In the present example, the encrypted file description data is embodied as:

```
<?xml version="1.0" encoding="UTF-8"?>
<fileEntry>
<url>https://constantine.skootit.com/restapi/cloudview/files/279d258a-2f7e-41a8-9132-
e8ebb6fcd814</url>
<referenceID>cloudview:jmorgan2</referenceID>
<entryID>279d258a-2f7e-41a8-9132-e8ebb6fcd814</entryID>
<name>CRW__6271__medium.jpg</name>
<parentID/>
<isFolder>false</isFolder>
<mimeType>application/octet-stream</mimeType>
<version number="1">
<owner>c03d811e-e53a-443c-affb-62789be25289</owner>
<size>1946893</size>
<date>1265749798000</date>
<hash>SHA-256:EzmQaflrPabM0b2pObeZb2F0HdTMctmqliY8hvkElzY=</hash>
<userTags>
<tag scope="public">foo</tag>
<tag scope="private">bar</tag>
<tag scope="public">1395340800256</tag>
</userTags>
<systemTags>
<tag scope="SYSTEM">PII-1395340800256</tag>
<tag scope="SYSTEM">PKCS-1395340800256</tag>
</systemTags>
<fileChunks>
<fileChunk>
<index>0</index>
<chunkID>712de8b30348fb60856b8326febc1b88b50e383a01a21dd63d4ff1182cdee95d</chunk
ID>
<cipherTextSize>503664</cipherTextSize>
<clearTextSize>524288</clearTextSize>
<key>AES/CBC/PKCS5Padding:mChlS9ckK0nF/SBr64FqLg==</key>
```

```
<initializationVector>AAAAAAAAAAAAAAAAAAAAAAA==</initializationVector>
<cipherHash>SHA-
256:EKAdBoBS9uYiqodVA4rrUbmEEHHropkL6pqxYrdE+VU=</cipherHash>
<clearHash>SHA-
256:6dVgX1HrTIjsc0hvHzQGGcAYXGBjXhX2DWRoQpiyBtc=</clearHash>
<compressionAlgorithm>GZIP</compressionAlgorithm>
</fileChunk>
<fileChunk>
<index>1</index>
<chunkID>ac247598d00ff6a3811226e5bdd2041abc84b848d3f7f3b4f82fef6061ffa097</chunkI
D>
<cipherTextSize>524496</cipherTextSize>
<clearTextSize>524288</clearTextSize>
<key>AES/CBC/PKCS5Padding:rgluLOPzOr19Tf9wW85gZw==</key>
<initializationVector>AAAAAAAAAAAAAAAAAAAAAAA==</initializationVector>
<cipherHash>SHA-
256:6aACKOJYtIPCUPtGOGlCQAmElAZ/PSVdyqJw97OOgTk=</cipherHash>
<clearHash>SHA-
256:UPayDLGmCrl7qKbbOxIqY0vKSv6lPjGk6zKA2nOhqDE=</clearHash>
<compressionAlgorithm>GZIP</compressionAlgorithm>
</fileChunk>
<fileChunk>
<index>2</index>
<chunkID>dc337d6783f4c9b836164be43673cfc0af1cd36addfe54c710ddadd4778celc6</chunkI
D>
<cipherTextSize>524496</cipherTextSize>
<clearTextSize>524288</clearTextSize>
<key>AES/CBC/PKCS5Padding:Pz4oXso/7Fso+zt3OpC3dA==</key>
<initializationVector>AAAAAAAAAAAAAAAAAAAAAAA==</initializationVector>
<cipherHash>SHA-
256:Y2HORv4mJCRM1sQBCs8AVHBR/wjLAJz4Qbjk5K/EFLk=</cipherHash>
<clearHash>SHA-
256:1TYVpqHwH7YD6tuw2doXzIVH6C0MuatCl9YqZUZZzUs=</clearHash>
<compressionAlgorithm>GZIP</compressionAlgorithm>
</fileChunk>
<fileChunk>
<index>3</index>
<chunkID>d94cec9645aff26bf13befb096565f70eeb937a31dd2cd96723e824e615a62c8</chunkI
D>
<cipherTextSize>373360</cipherTextSize>
<clearTextSize>374029</clearTextSize>
<key>AES/CBC/PKCS5Padding:WGn/ulNZBaA0710/vceQeA==</key>
<initializationVector>AAAAAAAAAAAAAAAAAAAAAAA==</initializationVector>
<cipherHash>SHA-
256:YkLAhWCmaSWihPyXOMeey4I/lkggzbOMpATaK8clk7s=</cipherHash>
<clearHash>SHA-256:paq1ZIj7F3B87GXwNSgqliool/5QLSRo7+uQ5xfHCVw=</clearHash>
<compressionAlgorithm>GZIP</compressionAlgorithm>
</fileChunk>
</fileChunks>
</version>
</fileEntry>
```

The segment metadata is collected. Here, the metadata comprises: segment ID, segment index (position of this segment in the file), clear text size, clear text hash, clear text hash algorithm, compression algorithm, segment encryption key, segment initialization vector, segment encryption algorithm, segment encryption mode, segment encryption padding mode, cipher text size, cipher text hash, and cipher text hash algorithm.

The preceding steps are repeated for each segment.

The File Description XML Document is then generated using the file and segment metadata. Some of the metadata fields, such as hashes and their associated hash algorithms, are combined together for the convenience of the user. The sensitive fields of the File Description XML Document are encrypted using the shared key associated with the file transfer. This shared key may be the workspace key of the workspace the file is being added to, or a randomly generated transfer key that is stored in the command the file is being transferred in response to. All of the segment metadata fields, except for the segment index, are encrypted. The Encrypted File Description XML Document is sent to the server. Each segment is uploaded to the server.

FIG. 1A and FIG. 1B illustrate a schematic embodiment of a networked computer system, a source computer system, and a recipient computer system. The embodiment of FIG. 1A includes a file transfer server. The embodiment of FIG. 1B does not comprise a file transfer server for transferring a file between the source computer system and the recipient computer system.

What is claimed is:

1. A system for decrypting a file, the system comprising:
a computer system comprising one or more processors programmed with computer program instructions that, when executed by the one or more processors, cause the computer system to:
obtain encrypted file description data related to a file, the file comprising a plurality of file segments;
with respect to each file segment of the plurality of file segments, perform decryption on the encrypted file description data to extract from the encrypted file description data (i) a reference associated with the file segment and (ii) a key associated with the file segment, the associated key being configured for decrypting an encrypted version of the file segment and configured to be different from at least another key for decrypting an encrypted version of another file segment of the plurality of file segments;

with respect to each file segment of the plurality of file segments, subsequent to the extraction of the associated reference and the associated key, use the associated reference and the associated key to obtain the file segment; and combine the file segments to reproduce the file.

2. The system of claim 1, wherein, with respect to each file segment of the plurality of file segments, obtaining the file segment comprises:

using the associated reference to download an encrypted file segment corresponding to the file segment; and using the associated key to perform decryption on the encrypted file segment to extract the file segment from the encrypted file segment.

3. The system of claim 2, with respect to each file segment of the plurality of file segments, the associated key was used to generate the encrypted file segment corresponding to the file segment.

4. The system of claim 1, wherein performing decryption on the encrypted file description data comprises using a group key associated with a group to perform decryption on the encrypted file description data to extract the associated references and the associated keys.

5. The system of claim 1, wherein, with respect to each file segment of the plurality of file segments:

the associated reference comprises an identifier associated with the file segment; and using the associated reference and the associated key comprises using the associated identifier and the associated key to obtain the file segment.

6. The system of claim 1, wherein, with respect to each file segment of the plurality of file segments:

the associated reference comprises a location reference associated with the file segment; and using the associated reference and the associated key comprises using the associated location reference and the associated key to obtain the file segment.

7. A non-transitory computer-readable storage media comprising instructions that, when executed by one or more processors, cause operations comprising:

obtaining encrypted file description data related to a file, the file comprising a plurality of file segments;

with respect to each file segment of the plurality of file segments, performing decryption on the encrypted file description data to obtain a reference associated with the file segment and a key associated with the file segment;

with respect to each file segment of the plurality of file segments, subsequent to the obtainment of the associated reference and the associated key, using the associated reference and the associated key to obtain the file segment; and combining the obtained file segments to reproduce the file.

8. The non-transitory computer-readable storage media of claim 7, wherein, with respect to each file segment of the plurality of file segments, obtaining the file segment comprises:

using the associated reference to download an encrypted file segment corresponding to the file segment; and using the associated key to perform decryption on the encrypted file segment to obtain the file segment.

9. The non-transitory computer-readable storage media of claim 8, with respect to each file segment of the plurality of file segments, the associated key was used to generate the encrypted file segment corresponding to the file segment.

10. The non-transitory computer-readable storage media of claim 7, wherein performing decryption on the encrypted file description data comprises using a group key associated with a group to perform decryption on the encrypted file description data to extract the associated references and the associated keys.

11. The non-transitory computer-readable storage media of claim 7, wherein, with respect to each file segment of the plurality of file segments:

the associated reference comprises an identifier associated with the file segment; and using the associated reference and the associated key comprises using the associated identifier and the associated key to obtain the file segment.

12. The non-transitory computer-readable storage media of claim 7, wherein, with respect to each file segment of the plurality of file segments:

the associated reference comprises a location reference associated with the file segment; and using the associated reference and the associated key comprises using the associated location reference and the associated key to obtain the file segment.

13. The non-transitory computer-readable storage media of claim 7, wherein, with respect to each file segment of the plurality of file segments, the associated key is configured for decrypting an encrypted version of the file segment and configured to be different from at least another key for decrypting an encrypted version of another file segment of the plurality of file segments.

14. A method comprising:

obtaining encrypted file description data related to a file, the file comprising a plurality of file segments;

with respect to each file segment of the plurality of file segments, performing decryption on the encrypted file description data to obtain a reference associated with the file segment and a key associated with the file segment;

with respect to each file segment of the plurality of file segments, subsequent to the obtainment of the associated reference and the associated key, using the associated reference and the associated key to obtain the file segment; and combining the obtained file segments to reproduce the file.

15. The method of claim 14, wherein, with respect to each file segment of the plurality of file segments, obtaining the file segment comprises:

using the associated reference to download an encrypted file segment corresponding to the file segment; and using the associated key to perform decryption on the encrypted file segment to obtain the file segment.

16. The method of claim 15, with respect to each file segment of the plurality of file segments, the associated key was used to generate the encrypted file segment corresponding to the file segment.

17. The method of claim 14, wherein, with respect to each file segment of the plurality of file segments:

the associated reference comprises an identifier associated with the file segment; and using the associated reference and the associated key comprises using the associated identifier and the associated key to obtain the file segment.

18. The method of claim 14, wherein, with respect to each file segment of the plurality of file segments:
- the associated reference comprises a location reference associated with the file segment; and
- using the associated reference and the associated key comprises using the associated location reference and the associated key to obtain the file segment.

19. A non-transitory computer-readable storage media comprising instructions that, when executed by one or more processors, cause operations comprising:
- with respect to each file segment of a plurality of file segments of a file, obtaining a reference associated with the file segment and a key associated with the file segment, the associated reference being configured to be used to identify a location of an encrypted file segment corresponding to the file segment, the associated key being configured to be used to perform decryption on the encrypted file segment to obtain the file segment;
- generating encrypted file description data related to the file such that the encrypted file description data comprises the associated references and the associated keys; and
- providing the encrypted file description data in response to a request for the file.

20. The non-transitory computer-readable storage media of claim 19, wherein generating the encrypted file description data comprises using a group key associated with a group to perform encryption on file description data comprising the associated references and the associated keys.

* * * * *